United States Patent
Timmons et al.

(10) Patent No.: US 10,277,506 B2
(45) Date of Patent: Apr. 30, 2019

(54) STATEFUL LOAD BALANCING IN A STATELESS NETWORK

(71) Applicant: 128 Technology, Inc., Burlington, MA (US)

(72) Inventors: Patrick Timmons, Newton, MA (US); Michael Baj, Somerville, MA (US); Hadriel Kaplan, Nashua, NH (US); Patrick MeLampy, Dunstable, MA (US); Prashant Kumar, Andover, MA (US); Robert Penfield, Concord, MA (US)

(73) Assignee: 128 TECHNOLOGY, INC., Burlington, MA (US)

( * ) Notice: Subject to any disclaimer, the term of this patent is extended or adjusted under 35 U.S.C. 154(b) by 504 days.

(21) Appl. No.: 14/562,917

(22) Filed: Dec. 8, 2014

(65) Prior Publication Data

US 2016/0164780 A1 Jun. 9, 2016

(51) Int. Cl.
H04L 12/733 (2013.01)
H04L 12/721 (2013.01)
(Continued)

(52) U.S. Cl.
CPC .............. H04L 45/70 (2013.01); H04L 45/38 (2013.01); H04L 45/54 (2013.01); H04L 47/125 (2013.01)

(58) Field of Classification Search
CPC .. H04L 45/00; H04L 2012/6472; H04L 45/60
(Continued)

(56) References Cited

U.S. PATENT DOCUMENTS 6,515,963 B1 2/2003 Bechtolsheim et al. ...... 370/229
6,563,824 B1 5/2003 Bhatia et al.
(Continued)

FOREIGN PATENT DOCUMENTS

CN 101552703 A 10/2009
CN 101646220 A 2/2010
(Continued)

OTHER PUBLICATIONS

International Searching Authority, International Search Report—International Application No. PCT/US2015/044815, dated Dec. 6, 2015, together with the Written Opinion of the International Searching Authority, 8 pages.
(Continued)

Primary Examiner — Asad M Nawaz
Assistant Examiner — Jason A Harley
(74) Attorney, Agent, or Firm — Nutter McClennen & Fish LLP

(57) ABSTRACT

A packet routing method for directing packets of a session in an IP network causes an intermediate node to obtain a lead packet of a plurality of packets in a given session. The intermediate node has an electronic interface in communication with the IP network and obtains the lead packet through that same interface. The method maintains, in a routing database, state information relating to a plurality of sessions in the IP network. Each session includes a single stateful session path formed by an ordered plurality of nodes in the IP network, and the state information includes information about the ordered plurality of nodes in the sessions. The method further accesses the routing database to determine the state of a plurality of sessions, and forms a stateful given path for packets of the given session across the IP network as a function of the state information in the routing database.

29 Claims, 16 Drawing Sheets

(51) Int. Cl.
*H04L 12/741* (2013.01)
*H04L 12/803* (2013.01)

(58) Field of Classification Search
USPC .......................................... 370/400; 398/49
See application file for complete search history.

(56) References Cited

U.S. PATENT DOCUMENTS

| | | | |
|---|---|---|---|
| 6,584,071 B1 | 6/2003 | Kodialam et al. | |
| 6,721,334 B1* | 4/2004 | Ketcham | H04L 49/90 370/465 |
| 6,738,387 B1 | 5/2004 | Lin et al. | 370/429 |
| 6,778,531 B1 | 8/2004 | Kodialam et al. | |
| 6,798,743 B1 | 9/2004 | Ma et al. | |
| 7,020,143 B2 | 3/2006 | Zdan | |
| 7,035,214 B1 | 4/2006 | Seddigh et al. | |
| 7,106,739 B2 | 9/2006 | Beier | |
| 7,154,902 B1 | 12/2006 | Sikdar | |
| 7,218,632 B1 | 5/2007 | Bechtolsheim et al. | |
| 7,315,541 B1 | 1/2008 | Housel et al. | |
| 7,373,660 B1 | 5/2008 | Guichard et al. | |
| 7,466,703 B1 | 12/2008 | Arunachalam et al. | |
| 7,536,720 B2 | 5/2009 | Burdett et al. | |
| 7,634,805 B2 | 12/2009 | Aroya | |
| 7,706,411 B2 | 4/2010 | Wakumoto et al. | |
| 7,730,301 B2 | 6/2010 | Correll et al. | |
| 7,773,611 B2 | 8/2010 | Booth, III et al. | |
| 7,872,973 B2 | 1/2011 | Sterne et al. | |
| 8,068,417 B1 | 11/2011 | Roberts | 370/230 |
| 8,094,560 B2 | 1/2012 | Bagepalli et al. | |
| 8,139,479 B1 | 3/2012 | Raszuk | |
| RE44,119 E | 4/2013 | Wang et al. | |
| 8,437,248 B2 | 5/2013 | Li et al. | |
| 8,527,641 B2 | 9/2013 | Degaonkar et al. | |
| 8,570,893 B2 | 10/2013 | Guo et al. | |
| 8,584,199 B1 | 11/2013 | Chen et al. | |
| 8,634,428 B2 | 1/2014 | Le Pennec et al. | |
| 8,804,489 B2 | 8/2014 | Lu et al. | |
| 8,942,085 B1 | 1/2015 | Pani et al. | |
| 8,989,020 B2 | 3/2015 | So | |
| 9,059,920 B2 | 6/2015 | Ravindran et al. | |
| 9,160,652 B2 | 10/2015 | Taillon et al. | |
| 9,240,953 B2 | 1/2016 | Carlstrom | |
| 9,276,864 B1 | 3/2016 | Vincent | |
| 2001/0030649 A1 | 10/2001 | Mamiya et al. | 345/530 |
| 2002/0044553 A1 | 4/2002 | Chakravorty | |
| 2002/0075883 A1 | 6/2002 | Dell et al. | 370/413 |
| 2002/0176363 A1 | 11/2002 | Durinovic-Johri et al. | |
| 2003/0198189 A1* | 10/2003 | Roberts | H04L 45/00 370/252 |
| 2003/0214938 A1 | 11/2003 | Jindal et al. | |
| 2004/0088542 A1 | 5/2004 | Daude et al. | |
| 2004/0264481 A1* | 12/2004 | Darling | H04L 29/06 370/401 |
| 2005/0036616 A1 | 2/2005 | Huang et al. | |
| 2005/0063307 A1 | 3/2005 | Samuels et al. | 370/235 |
| 2005/0182932 A1 | 8/2005 | Wheeler | |
| 2005/0238022 A1 | 10/2005 | Panigrahy | 370/392 |
| 2006/0176894 A1 | 8/2006 | Oh et al. | |
| 2007/0171825 A1 | 7/2007 | Roberts et al. | 370/235 |
| 2007/0171826 A1 | 7/2007 | Roberts et al. | 370/235 |
| 2008/0159288 A1* | 7/2008 | Nagarajan | H04L 45/10 370/392 |
| 2008/0214175 A1 | 9/2008 | Papadoglou et al. | |
| 2009/0007021 A1 | 1/2009 | Hayton | |
| 2009/0059958 A1 | 3/2009 | Nakata | |
| 2009/0245173 A1* | 10/2009 | Kano | H04W 76/021 370/328 |
| 2010/0125898 A1 | 5/2010 | Dubuc et al. | |
| 2010/0191968 A1 | 7/2010 | Patil et al. | |
| 2011/0069714 A1 | 3/2011 | Le Pennec et al. | |
| 2012/0144061 A1 | 6/2012 | Song | |
| 2012/0236860 A1 | 9/2012 | Kompella et al. | |
| 2013/0227146 A1* | 8/2013 | Wang | H04L 47/724 709/226 |
| 2013/0227166 A1* | 8/2013 | Ravindran | H04L 67/327 709/238 |
| 2013/0297824 A1 | 11/2013 | Lan et al. | |
| 2014/0040488 A1 | 2/2014 | Small et al. | |
| 2015/0188814 A1 | 7/2015 | Jain et al. | |
| 2015/0229618 A1 | 8/2015 | Wan et al. | |
| 2015/0381324 A1 | 12/2015 | Mirsky et al. | |
| 2016/0094444 A1* | 3/2016 | MeLampy | H04L 45/38 370/392 |

FOREIGN PATENT DOCUMENTS

| | | | |
|---|---|---|---|
| CN | 101068242 B | 4/2010 | |
| CN | 102158371 A | 8/2011 | |
| CN | 101640629 B | 8/2012 | |
| CN | 102739507 A | 10/2012 | |
| CN | 101207604 B | 3/2013 | |
| CN | 102769679 B | 6/2015 | |
| CN | 103179192 B | 11/2015 | |
| CN | 105245469 A | 1/2016 | |
| EP | 1 313 267 B1 | 12/2006 | H04L 12/56 |
| KR | 10-2011-0062994 A | 6/2011 | |
| WO | WO 2007/084707 A2 | 7/2007 | H04J 1/16 |
| WO | WO 2007/084755 A2 | 7/2007 | H04J 1/16 |
| WO | WO 2008/043230 A1 | 4/2008 | |
| WO | WO 2015/131537 A1 | 9/2015 | |

OTHER PUBLICATIONS

Chiosi, et al, *Network Functions Virtualisation—Introductory White Paper*, at the "SDN and OpenFlow World Congress", Darmstadt-Germany, (http://portal.etsi.org/nfv/nfv_white_paper), 16 pages, dated Oct. 22, 2012.
Davis, *Layer 3 Switches Explained*, Happy Router, 6 pages, dated Aug. 30, 2007.
Iana, *Transmission Control Protocol (TCP) Parameters*, (www.iana.org/assignments/tcp-parameters/tcp-parameters.xhtm), 5 pages, dated Sep. 22, 2014.
Klement, 1.2 Overview of a TCP communications session, RPG IV Socket Tutorial (http://www.scottklement.com/rpg/socketut/overview), 2 pages, 2001.
PC Magazine Encyclopedia, *Definition of: TCP/IP abc's*, PC Magazine Encyclopedia (www.pcmag.com/encyclopedia/term/52615), 5 pages, 2005.
Roberts, *The Next Generation of IP—Flow Routing*, SSGRR 2003S International Conference, L'Aquila Italy, 13 pages, Jul. 29, 2003.
Rouse, *What is routing table?* Posted by Margaret Rouse (http://searchnetworking.techtarget.com/definition/routing-table), 5 pages, Apr. 2007.
Shang, et al., "Making Better Use of All Those TCP ACK Packets," Computer Science Department, Worcester Polytechnic Institute, 2005, 10 pages.
Wikipedia, *LAN switching*, 5 pages, dated Jun. 12, 2013.
Wikipedia, *Management information base*, 6 pages, dated Jul. 15, 2013.
Wikipedia, *Reverse path forwarding*, 3 pages, dated Jul. 31, 2013.
Wikipedia, *Equal-cost multi-path routing*, 1 page, dated Sep. 12, 2013.
Wikipedia, *Transmission Control Protocol*, 18 pages, dated Sep. 16, 2013.
Wikipedia, *Software-defined networking*, 6 pages, dated Sep. 16, 2013.
Wikipedia, *Network socket*, 4 pages, dated Sep. 19, 2013.
Wikipedia, *Network address translation*, 11 pages, dated Sep. 24, 2013.
Wikipedia, *Router (computing)*, 8 pages, dated Sep. 23, 2013.
Wikipedia, *Open vSwitch*, 2 pages, dated Nov. 24, 2013.
International Searching Authority, International Search Report—International Application No. PCT/US2015/060840, dated Mar. 8, 2016, together with the Written Opinion of the International Searching Authority, 13 pages.

(56) References Cited

OTHER PUBLICATIONS

Berners-Lee et al., *Uniform Resource Identifier (URI): Generic Syntax*, Network Working Group, Request for Comments 3986, The Internet Society, 61 pages, Jan. 2005.
Bjorklund, *YANG—A Data Modeling Language for the Network Configuration Protocol (NETCONF)*, Internet Engineering Task Force (IETF), Request for Comments 6020, ISSN: 2070-1721, 173 pages, Oct. 2010.
Cisco Systems, *Parallel Express Forwarding on the Cisco 10000 Series*, (White Paper) Cisco Systems, printed Jun. 17, 2015, 4 pages.
Data Plane Development Kit, *Programmer's Guide, Release 16.04.0*, 216 pages, Apr. 12, 2016.
Filsfils et al., *Segment Routing Architecture*, Network Working Grroup, Draft, 28 pages, Oct. 21, 2013.
Hansson, et al., *A Unified Approach to Constrained Mapping and Routing on Network-on-Chip Architectures*, CODES+ISSS '05 Proceedings of the 3rd IEEE/ACM/IFIP International Conference on Hardware/Software Codesign and System Synthesis, 6 pages, Sep. 19-21, 2005.
Herbert, *xps: Transmit Packet Steering*, Eklektix, Inc., Oct. 26, 2010, 11 pages.
Katz et al., *Bidirectional Forwarding Detection (BFD)*, Internet Engineering Task Force (IETF), Request for Comments 5880, ISSN: 2070-1721, Juniper Networks, 49 pages, Jun. 2010.
Microsoft, *Introduction to Receive Side Scaling*, Developer Resources, https://msdn.microsoft.com/en-us/library/windows/hardware/ff556942(v=vs.85).aspx, 3 pages, Apr. 2014.
Microsoft, *RSS with a Single Hardware Receive Queue*, Developer Resources, https://msdn.microsoft.com/en-us/library/windows/hardware/ff570727(v=vs.85).aspx, 2 pages, Jan. 2015.
Microsoft, *RSS with Hardware Queuing*, Developer Resources, https://msdn.microsoft.com/en-us/library/windows/hardware/ff570728(v=vs.85).aspx, 2 pages, Jan. 2015.
Microsoft, *Non-RSS Receive Processing*, Developer Resources, https://msdn.microsoft.com/en-us/library/windows/hardware/ff568798(v=vs.85).aspx, 2 pages, Jan. 2015.
Previdi, et al., *IPv6 Segment Routing Header (SRH)*, Network working Group, Draft, 24 pages, Jul. 3, 2014.
Shaw, *Multi-queue network interfaces with SMP on Linux*, Greenhost, https://greenhost.net/2013/04/10/multi-queue-network-interfaces-with-smp-on-linux/, 5 pages, Apr. 10, 2013.
Sollins et al., *Functional Requirements for Uniform Resource Names*, Network Working Group, Request for Comments 1737, 7 pages, Dec. 1994.
Srinivasan, et al., *A Technique for Low Energy Mapping and Routing in Network-on-Chip Architectures*, ISLPED '05 Proceedings of the 2005 International Symposium on Low Power Electronics and Design, 6 pages, Aug. 8-10, 2005.
Wikipedia, *Active queue management*, https://en.wikipedia.org/wiki/Active_queue_management, 2 pages, Apr. 22, 2015.
Wikipedia, Network interface controller, https://en.wikipedia.org/wiki/Network_interface_controller,5 pages, May 19, 2015.
International Searching Authority, International Search Report—International Application No. PCT/US2016/013416, dated Jun. 8, 2016, together with the Written Opinion of the International Searching Authority, 12 pages.
International Searching Authority, International Search Report—International Application No. PCT/US2016/026938, dated Jul. 28, 2016, together with the Written Opinion of the International Searching Authority, 9 pages.
European Patent Office, Supplementary European Search Report, Application No. 15867506.6-1213, 9 pages, dated Jun. 1, 2018.
International Organization for Standardization, "Protocol for Providing Connectionless Mode Network Service," XP-002129613, 4 pages, Mar. 1986.
Stoica, et al., "LIRA: An Approach for Service Differentiation in the Internet," 2013 IEEE International Conference on Communications (ICC), 14 pages, 1998.
Caida, *Observing routing asymmetry in Internet traffic*, (www.caida.org/research/traffic-analysis/asymmetry/1), 7 pages, dated Jul. 17, 2013.

\* cited by examiner

STATEFUL LOAD BALANCING IN A STATELESS NETWORK

RELATED APPLICATIONS

This patent application is related to U.S. patent application Ser. No. 14/497,954, filed Sep. 29, 2014, entitled, "NETWORK PACKET FLOW CONTROLLER," and naming Patrick J. MeLampy, Michael Baj, Hadriel Kaplan, Prashant Kumar, Robert Penfield, and Patrick Timmons as inventors, the disclosure of which is incorporated herein, in its entirety, by reference.

TECHNICAL FIELD

The present invention relates to data routing and, more particularly, to routing packets in an IP network.

BACKGROUND ART

The Internet Protocol ("IP") serves as the de-facto standard for forwarding data messages ("datagrams") between network devices connected with the Internet. To that end, IP delivers datagrams across a series of Internet devices, such as routers and switches, in the form of one or more data packets. Each packet has two principal parts: (1) a payload with the information being conveyed (e.g., text, graphic, audio, or video data), and (2) a header, known as an "IP header," having the address of the network device to receive the packet(s) (the "destination device"), the identity of the network device that sent the packet (the "originating device"), and other data for routing the packet.

Many people thus analogize packets to a traditional letter using first class mail, where the letter functions as the payload, and the envelope, with its return and mailing addresses, functions as the IP header.

Current Internet devices forward packets one-by-one based essentially on the address of the destination device in the packet header. Among other benefits, this routing scheme enables network devices to forward packets among a series of related packets along different routes to reduce network congestion, or avoid malfunctioning network devices. Those skilled in the art thus refer to IP as a "stateless" protocol because, among other reasons, it does not save packet path data, and does not pre-arrange transmission of packets between end points.

While it has benefits, IP's statelessness introduces various limitations. For example, without modification, a stateless IP network inhibits or prevents: 1) user mobility in mobile networks, 2) session layer load balancing for packet traffic in the network, and 3) routing between private or overlapping networks. The art has responded to this problem by implementing tunneling protocols, which provide these functions. Specifically, tunneling protocols transport IP packets to a destination along a route that normally is different than the route the packet would have taken if it had not used a tunneling protocol. While nominally accomplishing their goals, tunneling protocols undesirably introduce additional problems into the network. For example, tunneling requires additional overhead that can induce IP packet fragmentation, consequently introducing substantial network inefficiencies into a session. In addition, tunnels generally use more bandwidth than non-tunneled packets, and tunnel origination and termination requires additional CPU cycles per packet.

Other attempts to overcome problems introduced by statelessness suffer from similar deficiencies.

SUMMARY OF VARIOUS EMBODIMENTS

In accordance with one embodiment of the invention, a packet routing method for directing packets of a session between an originating node and a destination node in an IP network causes an intermediate node to obtain a lead packet of a plurality of packets in a given session. The intermediate node has an electronic interface in communication with the IP network and obtains the lead packet through that same electronic interface. The method also maintains, in a routing database, state information relating to a plurality of sessions in the IP network. Each session includes a single stateful session path formed by an ordered plurality of nodes in the IP network, and the state information includes information relating to the ordered plurality of nodes in the sessions. The method further accesses the routing database to determine the state of a plurality of the sessions, and forms a stateful given path for packets of the given session across the IP network (between the intermediate node and destination node) as a function of the state information in the routing database. In addition, the method stores state information relating to the stateful given path and the given session in the routing database, and forwards the lead packet via the electronic interface toward the destination along the stateful given path.

Among other things, the intermediate node may include a routing device or a switching device. Moreover, the destination router may include any of a plurality of different network devices, such as an edge router for a data center network.

The ordered plurality of nodes in each session preferably includes a plurality of nodes between two end nodes. The plurality of nodes between the two end nodes in each session are configured to transmit each packet in its session in the same node order between the two end nodes. For example, if the ordered nodes of a stateful path includes first, second and third nodes that receive packets in that order, then the first node may be configured to direct packets toward the second node only and not toward the third node, and the second node may be configured to direct packets toward the third node only and not the first node. In a similar manner, the stateful given path may include an ordered plurality of given nodes between the originating node and the destination node. This ordered plurality of given nodes preferably has a first node (logically) next to the originating node and thus, the first node serves as the intermediate node.

Among other load balancing techniques, the stateful given path may be formed by accessing one or more of utilization and cost information relating to a plurality of nodes in the routing database. In a corresponding manner, the process may form the given path using additional information such as utilization of the stateful session paths and bandwidth of the stateful session paths.

In some embodiments, the method may receive a plurality of additional packets for the given session from the originating node, and forward the plurality of additional packets for the given session toward the destination node along the stateful given path. In a corresponding manner, the method may receive a plurality of packets, addressed toward the originating node, in a return session from the destination node. After receipt, the method may forward, through the electronic interface, substantially all of the packets in the return session toward the originating node along the stateful given path.

Although logically next to each other, the packets may traverse through other intermediate network devices between (logically) adjacent nodes in an ordered path. To that end, the stateful given path may have an ordered plurality of given nodes between the originating node and the destination node, and the ordered plurality of given nodes may include the intermediate node and a next node next to and downstream of the intermediate node within the ordered plurality of given nodes. The method thus may address the lead packet to the next node so that a plurality of network devices receive the lead packet after it is forwarded and before the next node receives the lead packet.

BRIEF DESCRIPTION OF THE DRAWINGS

The invention will be more fully understood by referring to the following Detailed Description of Specific Embodiments in conjunction with the Drawings, of which.

DETAILED DESCRIPTION OF SPECIFIC EMBODIMENTS

In accordance with preferred embodiments of the invention, a network device uses information about the state of a normally stateless network to balance session flows across that network. Details of various embodiments are discussed below.

Networks

Illustrative embodiments preferably are implemented on a conventional computer network. Among other things, a network includes at least two nodes and at least one link between the nodes. Nodes can include computing devices (sometimes referred to as hosts or devices) and routers. Computers may include personal computers, smart phones, television "cable boxes," automatic teller machines (ATMs) and many other types of equipment that include processors and network interfaces. Links include wired and wireless connections between pairs of nodes. In addition, nodes and/or links may be implemented completely in software, such as in a virtual machine, a software defined network, and using network function virtualization. Many networks include switches, which are largely transparent for purposes of this discussion. However, some switches also perform routing functions. For the present discussion, such routing switches are considered routers. Routers are described below.

Figure 1:
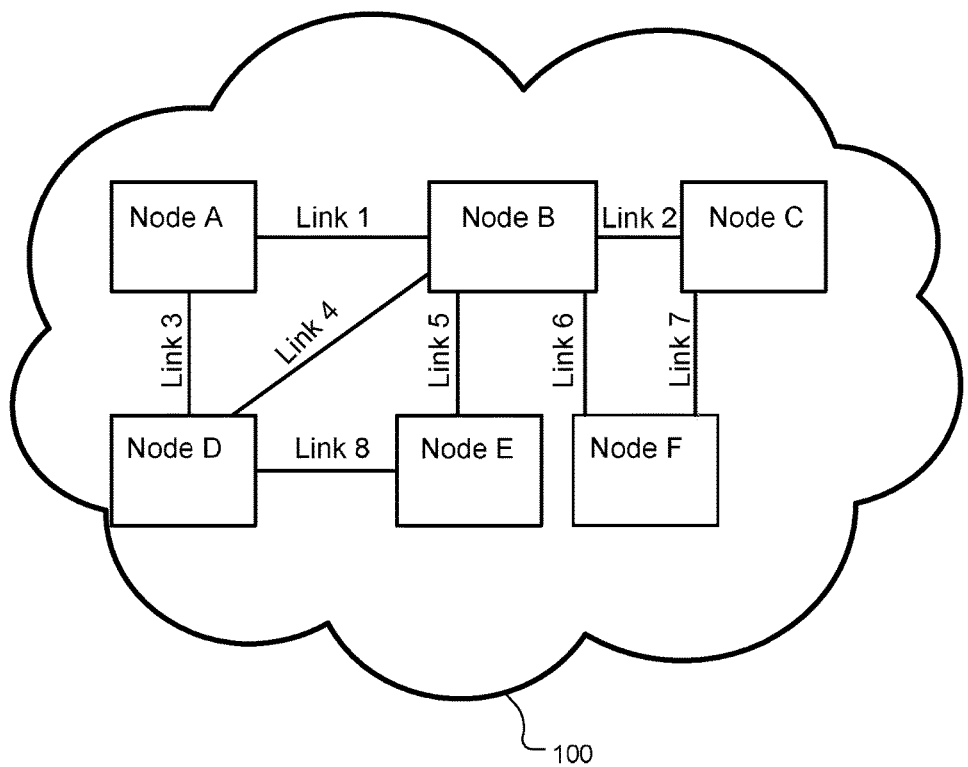
FIG. 1 is a schematic diagram of a hypothetical network, according to the prior art.

A node can be directly connected to one or more other nodes, each via a distinct link. For example, FIG. 1 schematically shows a Node A directly connected to Node B via Link 1. In a given network (e.g., within a local area network), each node has a unique network address to facilitate sending and receiving data. A network includes all the nodes addressable within the network according to the network's addressing scheme and all the links that interconnect the nodes for communication according to the network's addressing scheme. For example, in FIG. 1, Node A, Node B, Node C, . . . Node F and all the links 1-8 together make up a network 100. For simplicity, a network may be depicted as a cloud or as being enclosed within a cloud. Absence of a cloud, however, does not mean a collection of nodes and links are not a network. For example, a network may be formed by a plurality of smaller networks.

Nodes initiate communications with other nodes via the network, and nodes receive communications initiated by other nodes via the network. For example, a node may transmit/forward/send data (a message) to a directly connected (adjacent) node by sending the message via the link that interconnects the adjacent nodes. The message includes the network address of the sending node (the "source address") and the network address of the intended receiving node (the "destination address"). A sending node can send a message to a non-adjacent node via one or more other intervening nodes. For example, Node D may send a message to Node F via Node B. Using well known networking protocols, the node(s) between the source and the destination forward the message until the message reaches its destination. Accordingly, to operate properly, network protocols enable nodes to learn or discover network addresses of non-adjacent nodes in their network.

Nodes communicate via networks according to protocols, such as the well-known Internet Protocol (IP) and Transmission Control Protocol (TCP). The protocols are typically implemented by layered software and/or hardware components, such as according to the well-known seven-layer Open System Interconnect (OSI) model. As an example, IP operates at OSI Layer 3 (Network Layer), while the TCP operates largely at OSI Layer 4 (Transport Layer). Each layer performs a logical function and abstracts the layer below it, therefore hiding details of the lower layer.

Figure 2:
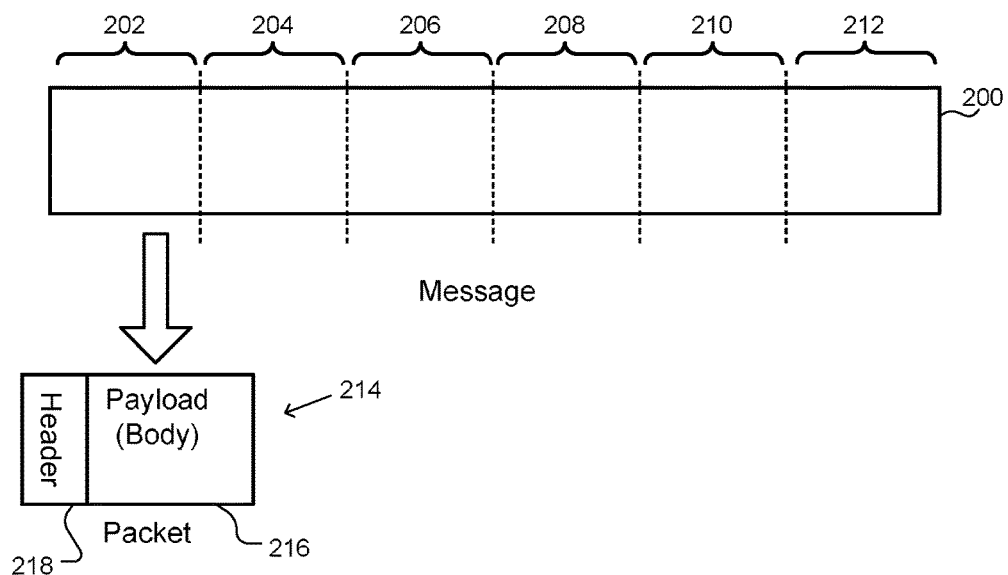
FIG. 2 is a schematic diagram illustrating fragmentation of a message, according to the prior art.

For example, Layer 3 may fragment a large message into smaller packets if Layer 2 (Data Link Layer) cannot handle the message as one transmission. FIG. 2 schematically illustrates a large message 200 divided into several pieces 202, 204, 206, 208, 210 and 212. Each piece 202-212 may then be sent in a separate packet, exemplified by packet 214. Each packet includes a payload (body) portion, exemplified by payload 216, and a header portion, exemplified at 218.

The header portion 218 contains information, such as the packet's source address, destination address and packet sequence number, necessary or desirable for: 1) routing the packet to its destination, 2) reassembling the packets of a message, and 3) other functions provided according to the protocol. In some cases, a trailer portion is also appended to the payload, such as to carry a checksum of the payload or of the entire packet. All packets of a message need not be sent along the same path, i.e., through the same nodes, on their way to their common destination. It should be noted that although IP packets are officially called IP datagrams, they are commonly referred to simply as packets.

Some other protocols also fragment data into packets. For example, the TCP fragments data into segments, officially referred to as TCP protocol data units (PDUs). Nevertheless, in common usage, the term packet is used to refer to PDUs and datagrams, as well as Ethernet frames.

Most protocols encapsulate packets of higher level protocols. For example, IP encapsulates a TCP packet by adding an IP header to the TCP packet to produce an IP packet. Thus, packets sent at a lower layer can be thought of as being made up of packets within packets. Conventionally, a component operating according to a protocol examines or modifies only information within a header and/or trailer that was created by another component, typically within another node, operating according to the same protocol. That is, conventionally, components operating according to a protocol do not examine or modify portions of packets created by other protocols.

In another example of abstraction provided by layered protocols, some layers translate addresses. Some layers include layer-specific addressing schemes. For example, each end of a link is connected to a node via a real (e.g., electronic) or virtual interface, such as an Ethernet interface. At Layer 2 (Data Link Layer), each interface has an address, such as a media access control (MAC) address. On the other hand, at Layer 3 using IP, each interface, or at least each node, has an IP address. Layer 3 converts IP addresses to MAC addresses.

Figure 3:
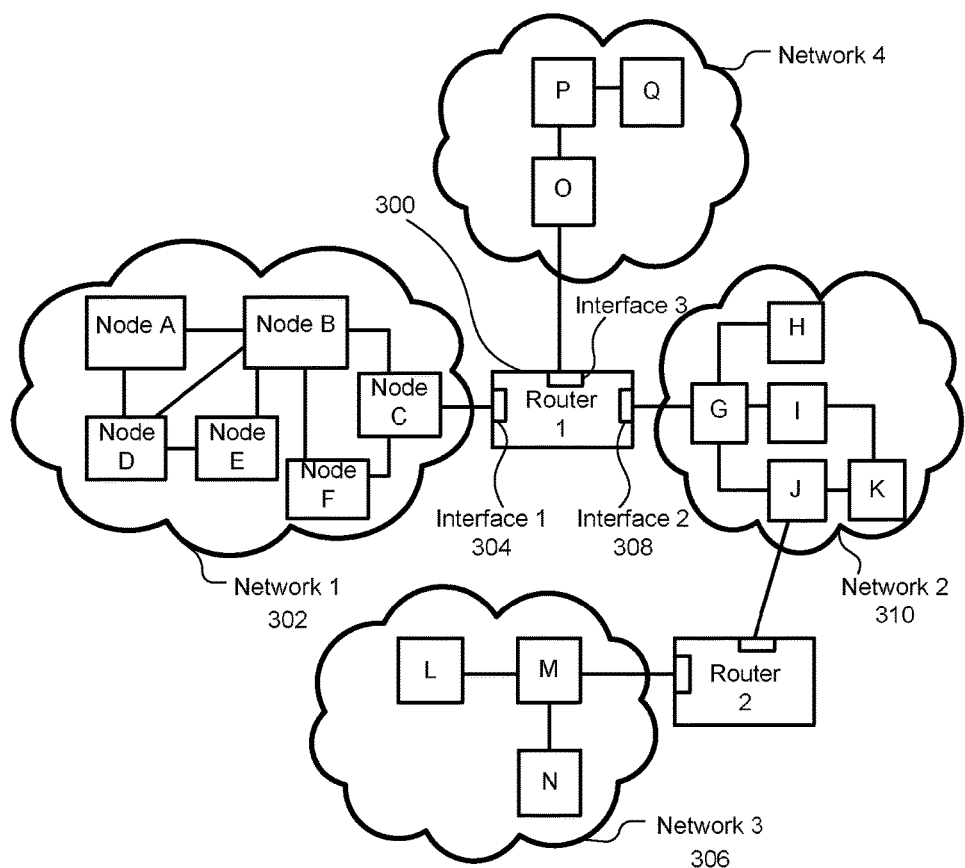
FIG. 3 is a schematic diagram of a hypothetical internet, according to the prior art.

A router typically acts as a node that interconnects two or more distinct networks or two or more sub-networks (subnets) of a single network, thereby creating a "network of networks" (i.e., an internet). Thus, a router has at least two interfaces, where each interface connects the router to a different network, as exemplified in FIG. 3. When a router receives a packet via one interface from one network, it uses information stored in its routing table to direct the packet to another network via another interface. The routing table contains network/next hop associations. These associations tell the router that a particular destination can optimally be reached by sending the packet to a specific router that represents a next hop on the way to the final destination. For example, if Router 1 300 receives a packet, via its Interface 1 304, from Network 1 302, and the packet is destined to a node in Network 3 306, the Router 1 300 consults its router table and then forwards the packet via its Interface 2 308 to Network 2 310. Network 2 310 will then forward the packet to Network 3 306. The next hop association can also be indicated in the routing table as an outgoing (exit) interface to the final destination.

Large organizations, such as large corporations, commercial data centers and telecommunications providers, often employ sets of routers in hierarchies to carry internal traffic. For example, one or more gateway routers may interconnect each organization's network to one or more Internet service providers (ISPs). ISPs also employ routers in hierarchies to carry traffic between their customers' gateways, to interconnect with other ISPs, and to interconnect with core routers in the Internet backbone.

A router is considered a Layer 3 device because its primary forwarding decision is based on the information in the Layer 3 IP packet—specifically the destination IP address. A conventional router does not look into the actual data contents (i.e., the encapsulated payload) that the packet carries. Instead, the router only looks at the Layer 3 addresses to make a forwarding decision, plus optionally other information in the header for hints, such as quality of service (QoS) requirements. Once a packet is forwarded, a conventional router does not retain historical information about the packet, although the forwarding action may be collected to generate statistical data if the router is so configured.

Accordingly, as discussed below, an IP network is considered to be "stateless" because, among other things, it does not maintain this historical information. For example, an IP network generally treats each request as an independent transaction that is unrelated to any previous request. A router thus may route a packet regardless of how it processed a prior packet. As such, an IP network typically does not store session information or the status of incoming communications partners. For example, if a part of the network becomes disabled mid-transaction, there is no need to reallocate resources or otherwise fix the state of the network. Instead, packets may be routed along other nodes in the network.

As noted, when a router receives a packet via one interface from one network, the router uses its routing table to direct the packet to another network. Table 1 lists information typically found in a basic IP routing table.

TABLE 1

| | |
|---|---|
| Destination | Partial IP address (Expressed as a bit-mask) or Complete IP address of a packet's final destination |
| Next hop | IP address to which the packet should be forwarded on its way to the final destination |
| Interface | Outgoing network interface to use to forward the packet |
| Cost/Metric | Cost of this path, relative to costs of other possible paths |
| Routes | Information about subnets, including how to reach subnets that are not directly attached to the router, via one or more hops; default routes to use for certain types of traffic or when information is lacking |

Routing tables may be filled in manually, such as by a system administrator, or dynamically by the router. The router uses routing protocols to exchange information with other routers and, thereby, dynamically learn about surrounding network or internet topology. For example, routers announce their presence in the network(s), more specifically, the range of IP addresses to which the routers can forward packets. Neighboring routers update their routing tables with this information and broadcast their ability to forward packets to the network(s) of the first router. This information eventually spreads to more distant routers in a network. Dynamic routing allows a router to respond to changes in a network or internet, such as increased network congestion, new routers joining an internet, and router or link failures.

A routing table therefore provides a set of rules for routing packets to their respective destinations. When a packet arrives, a router examines the packet's contents, such as its destination address, and finds the best matching rule in the routing table. The rule essentially tells the router which interface to use to forward the packet and the IP address of a node to which the packet is forwarded on its way to its final destination IP address.

With hop-by-hop routing, each routing table lists, for all reachable destinations, the address of the next node along a path to that destination, i.e., the next hop. Assuming that the routing tables are consistent, a simple algorithm of each router relaying packets to their destinations' respective next hop suffices to deliver packets anywhere in a network. Hop-by-hop is a fundamental characteristic of the IP Internetwork Layer and the OSI Network Layer.

Thus, each router's routing table typically merely contains information sufficient to forward a packet to another router that is "closer" to the packet's destination, without a guarantee of the packet ever being delivered to its destination. In a sense, a packet finds its way to its destination by visiting a series of routers and, at each router, using then-current rules to decide which router to visit next, with the hope that at least most packets ultimately reach their destinations.

Note that the rules may change between two successive hops of a packet or between two successive packets of a message, such as if a router becomes congested or a link fails. Two packets of a message may, therefore, follow different paths and even arrive out of order. In other words, when a packet is sent by a source or originating node, as a stateless network, there conventionally is no predetermined path the packet will take between the source node and the packet's destination. Instead, the path typically is dynamically determined as the packet traverses the various routers. This may be referred to as "natural routing," i.e., a path is determined dynamically as the packet traverses the internet.

Although natural routing has performed well for many years, natural routing has shortcomings. For example, because each packet of a session may travel along a different path and traverse a different set of routers, it is difficult to collect metrics for the session. Security functions that may be applicable to packets of the session must be widely distributed or risk not being applied to all the packets. Furthermore, attacks on the session may be mounted from many places.

It should be noted that conventionally, packets sent by the destination node back to the source node may follow different paths than the packets from the source node to the destination node.

In many situations, a client computer node ("client") establishes a session with a server computer node ("server"), and the client and server exchange packets within the session. For example, a client executing a browser may establish a session with a web server. The client may send one or more packets to request a web page, and the web server may respond with one or more packets containing contents of the web page. In some types of sessions, this back-and-forth exchange of packets may continue for several cycles. In some types of sessions, packets may be sent asynchronously between the two nodes.

A session has its conventional meaning; namely, it is a plurality of packets sent by one node to another node, where all the packets are related, according to a protocol. A session may be thought of as including a lead (or initial) packet that begins the session, and one or more subsequent packets of the session. A session has a definite beginning and a definite end. For example, a TCP session is initiated by a SYN packet. In some cases, the end may be defined by a pre-scribed packet or series of packets. For example, a TCP session may be ended with a FIN exchange or an RST. In other cases, the end may be defined by lack of communication between the nodes for at least a predetermined amount of time (a timeout time). For example, a TCP session may be ended after a defined timeout period. Some sessions include only packets sent from one node to the other node. Other sessions include response packets, as in the web client/server interaction example. A session may include any number of cycles of back-and-forth communication, or asynchronous communication, according to the protocol, but all packets of a session are exchanged between the same client/server pair of nodes. A session is also referred to herein as a series of packets.

A computer having a single IP address may provide several services, such as web services, e-mail services and file transfer (FTP) services. Each service is typically assigned a port number in the range 0-65,535 that is unique on the computer. A service is, therefore, defined by a combination of the node's IP address and the service's port number. Note that this combination is unique within the network the computer is connected to, and it is often unique within an internet. Similarly, a single node may execute many clients. Therefore, a client that makes a request to a service is assigned a unique port number on the client's node, so return packets from the service can be uniquely addressed to the client that made the request.

The term socket means an IP address-port number combination. Thus, each service has a network-unique, and often internet-unique, service socket, and a client making a request of a service is assigned a network-unique, and sometimes internet-unique, client socket. In places, the terms source client and destination service are used when referring to a client that sends packets to make requests of a service and the service being requested, respectively.

Forward and Backward Flow Control

Illustrative embodiments of the present invention at least in part overcome these and other shortcomings by ensuring that subsequent packets of a session follow the same path as the lead packet of the session, at least in the forward direction, i.e., from the source client to the destination service. The subsequent packets traverse at least a subset of the routers the lead packet traverses between the source client and the destination service. Each router in the subset is referred to herein as an intermediate node or waypoint, although, in some embodiments, the waypoints are not necessarily predetermined before the lead packet is sent by the source client. The lead packet may be naturally routed. The path taken by the lead packet thus establishes the waypoints, and the subsequent packets traverse the same waypoints, and in the same order, as the lead packet.

In illustrative embodiments discussed in greater detail below, however, an intermediate node/waypoint near the source predetermines the path the lead packet and subsequent packets will traverse to the destination service. In that case, the intermediate node (e.g., a router or switch) forms an ordered path of nodes in the network for bi-directionally forwarding packets in a given session. Accordingly, packets in this session traverse from node-to-node in the path in an order prescribed by the intermediate node. In both cases, the intermediate node may be considered to form a stateful ordered path of nodes between the source and destination.

Of course, some packets may be dropped along the way, as is typical in an IP network or internet, such as by an overloaded router or due to corruption of the packet by a link. Thus, all the packets sent by the source client need not reach the session's destination service and, consequently, all the packets sent by the source client need not traverse all the waypoints. However, subsequent packets that do reach the destination service must traverse all the waypoints. For simplicity of explanation, dropped packets are ignored in the remaining discussion, and the term "all the packets" means all the packets that reach their respective destinations.

As a result of this forward flow control, metrics collected at one of the waypoints represent all the packets of the session. These metrics are not diluted by packets that bypass the waypoint, because no packet of the session can bypass any waypoint. Security functions, such as inspection for malicious packets, performed at one waypoint are sure to be performed on all packets of the session. As discussed below, state information about the waypoints also can be used to perform load balancing operations when the intermediate node forms ordered paths.

Some embodiments of the present invention also ensure that return packets from the destination service to the source client also follow the same path, i.e., traverse the waypoints, but in reverse order. This reverse flow control enables use of paths, such as via proprietary networks, that might not otherwise be available by naturally routing the return packets.

Figure 4:
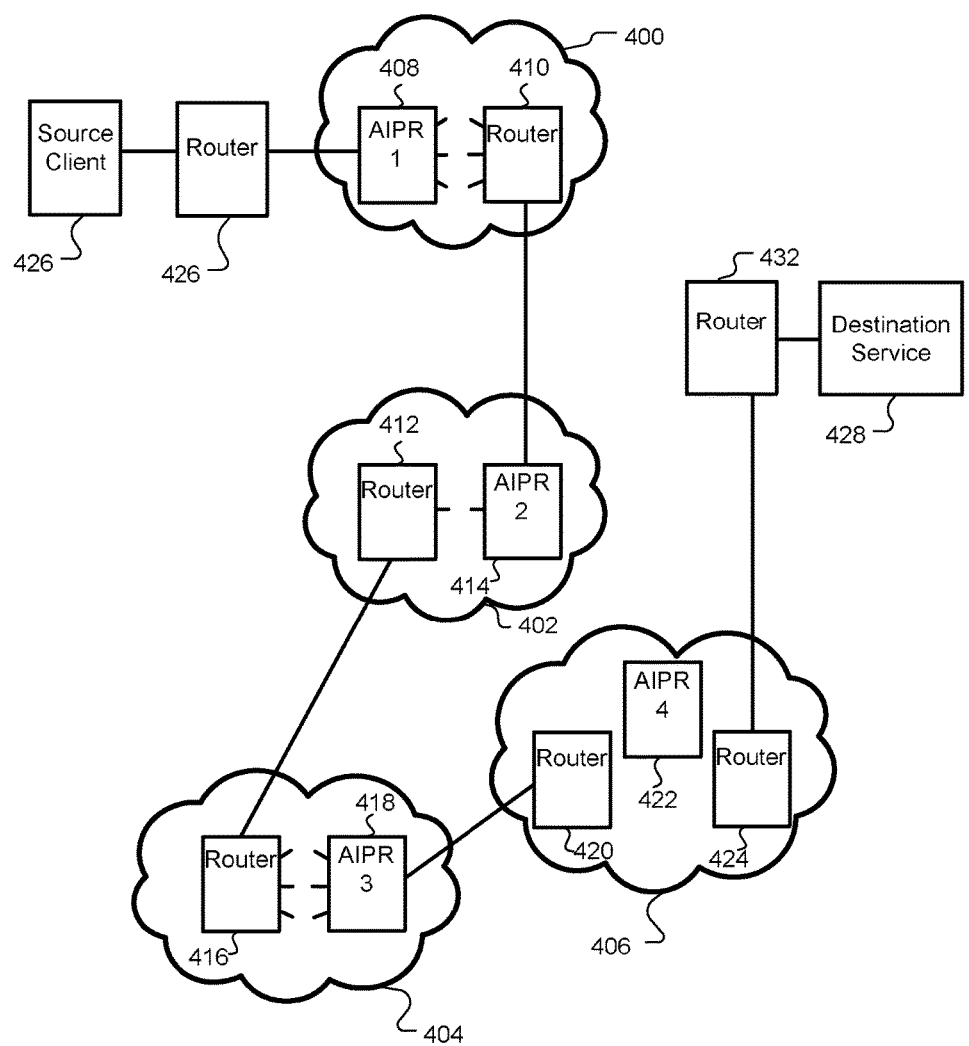
FIG. 4 is a schematic diagram of a hypothetical internet that includes a conventional routers and augmented IP routers (AIPRs), according to an embodiment of the present invention.

A packet flow controller (also referred to herein as an augmented IP router ("AIPR")) ensures that subsequent packets of a session follow the same path as the lead packet of the session, as discussed above. An AIPR also performs conventional routing functions. As such, the AIPR may be considered to perform the function of the intermediate node discussed above. FIG. 4 schematically illustrates a hypothetical set of interconnected networks 400, 402, 404 and 406, i.e., an internet, which could include the Internet. Each network 400-406 includes a number of routers and AIPRs, not all of which are necessarily shown. Network 400 includes AIPR1 408 and router 410. Network 400 may be, for example, a network of a telecommunications carrier. Network 402 includes a router 412 and AIPR 2 414. Network 402 may be, for example, a network of a first ISP. Network 404 includes a router 416 and AIPR 3 418. Network 404 may be, for example, the Internet backbone or a portion thereof. Network 406 includes a router 420, AIPR 4 422 and another router 424. Network 406 may be, for example, a network of a second ISP.

Assume a source client node 426 initiates a session with a destination service node 428. For example, the source client 426 may request a web page, and the destination service node 428 may include a web server. The source client 426 may, for example, be part of a first local area network (LAN) (not shown) within a first corporation (e.g., a datacenter), and the LAN may be connected to the telecommunications carrier network 400 via a gateway router 430 operated by the corporation. Similarly, the destination service node 428 may be operated by a second corporation, and it may be part of a second LAN (not shown) coupled to the network 406 of the second ISP via a gateway router 432 operated by the second corporation. As a lead packet of the session traverses the internet, each AIPR (waypoint) the packet traverses records information that eventually enables the waypoint to be able to identify its immediately previous waypoint and its immediately next waypoint, with respect to the session.

The lead packet of the session in this example is naturally routed. Assume the lead packet reaches AIPR 1 408 before it reaches network 402, 404 or 406. AIPR 1 408 automatically identifies the lead packet as being an initial packet of the session. AIPR 1 408 may use various techniques to identify the beginning of a session, as noted above and as discussed in more detail below. AIPR 1 408 becomes the first waypoint along a path the lead packet eventually follows.

AIPR 1 408 assigns a unique identifier to the session and stores information about the session in the AIPR's database to enable the AIPR 1 408 to identify subsequent packets of the session. In some embodiments, AIPR 1 408 reads the client socket/service socket number pair in the lead packet and stores the client socket/service socket number pair in a database to uniquely identify the session. This enables the AIPR 1 408 to identify the subsequent packets as being part of the session, because all subsequent packets of the session will contain the same client socket/service socket number pair.

In some embodiments, AIPR 1 408 sets a flag in its database to indicate the lead packet has not traversed any other AIPR before reaching AIPR 1 408. This flag may be used later, for example when the AIPR 1 408 handles return packets. AIPR 1 408 may be able to identify the lead packet as not having traversed any other AIPR by lack of any modification to the packet. Packet modification is described below.

AIPR 1 408 modifies the lead packet to indicate the lead packet has been handled by an AIPR. In some embodiments, the AIPR 1 408 stores the unique identifier of the session and, if not included in the unique identifier, the AIPR's network address in the packet to produce a modified lead packet. Subsequent AIPRs, if any, that handle the (now modified) lead packet use this modification to identify the lead packet as a lead packet that has been handled by an AIPR, and to indicate that subsequent packets of the session should be routed the same way as the lead packet is routed.

In some embodiments, AIPR 1 408 assigns a port number on the interface over which AIPR 1 408 will forward the lead packet. The AIPR's network address and this port number, in combination, may be used as a unique identifier of the session, at least from the point of view of the next AIPR along the path. AIPR 1 408 may include the AIPR's network address-port number combination in the modified lead packet. Thus, the next AIPR along the path may assume that subsequent packets sent from this network address-port number combination are part of, or likely to be part of, the session.

AIPR 1 408 then, in this example, forwards the lead packet naturally. The lead packet traverses an unspecified number of nodes of network 400 until it reaches router 410, which naturally routes the lead packet to network 402. Assume the router 410 forwards the lead packet to AIPR 2 414 in network 402.

AIPR 2 414 detects the modification to the lead packet, identifying a need for special treatment. AIPR 2 414 becomes the second waypoint along the path the lead packet will follow. Accordingly, AIPR 1 408 and AIPR 2 414 are considered to be "adjacent" waypoints or "next to" each other in the ordered path being formed. AIPR 2 414 responsively stores in its database the network address of AIPR 1 408 and the port number assigned by AIPR 1 408, in association with a unique identifier of the session, such as the client and server socket number pair, thus identifying the previous waypoint along the path in association with the session. In this way, each waypoint learns the network address and port number of the previous waypoint along this session's path and uses a related association device (an "associator") to associate this information with a session identifier. This information may be used later to forward return packets, from waypoint to waypoint, back to the source client 426.

In some embodiments, AIPR 2 414 assigns a port number on the interface over which the lead packet was received. The AIPR's network address and this port number, in combination, may be used as a unique identifier of the session, at least from the point of view of AIPR 1 408. Thus, subsequent packets addressed to this network address-port number combination may be assumed to be, or at least are likely to be, part of the session.

In some embodiments, AIPR 2 414 sends a packet back to AIPR 1 408 to inform AIPR 1 408 of the network address-port number combination, in association with the identification of the session. In some embodiments, the network address-port number combination are sent to AIPR 1 408 later, in connection with a return packet, as described below. In either case, AIPR 1 408 learns a network address-port number combination unique to the session, and AIPR 1 408 sends subsequent packets to that address-port combination, rather than naturally forwarding the subsequent packets. In this way, each waypoint learns the network address and port number of the next waypoint along this session's path. This information is used to forward subsequent packets, from waypoint to waypoint, forward to the destination service 428, along the same path as the lead packet. This kind of routing is unlike any routing taught by the prior art known to the inventors.

AIPR 2 214 modifies the lead packet to include the network address of AIPR 2 214, and then forwards the lead packet naturally. As with AIPR 1 408, in some embodiments AIPR 2 214 assigns a port number on the interface over which AIPR 2 214 forwards the packet, and the network address of AIPR 2 214 and the port number are included in the modified lead packet AIPR 2 214 sends.

The lead packet traverses an unspecified number of nodes of network 402, until it reaches router 412, which naturally routes the lead packet to network 404. Assume the router 416 forwards the lead packet to AIPR 3 418.

AIPR 3 418 becomes the third waypoint along the path the lead packet will follow. AIPR 3 418 operates much as AIPR 2 414. The lead packet is then forwarded to network 406, where it traverses AIPR 4 422, which becomes the fourth waypoint.

Three scenarios are possible with respect to the last AIPR 422 (AIPR 4) along the path to the destination service 428.

In the first scenario, one or more AIPRs relatively close to a destination service are provisioned to handle lead packets for the destination service. The AIPRs may be so provisioned by storing information in their databases to identify the destination service, such as by the service socket number or other unique identifier of the service. These "terminus" AIPRs broadcast their ability to forward packets to the destination service. A terminus AIPR is an AIPR that can forward packets to a destination service, without the packets traversing another AIPR. A terminus AIPR recognizes a lead packet destined to a service that terminates at the AIPR by comparing the destination service socket number to the information provisioned in the AIPR's database.

If AIPR 4 422 has been so provisioned, AIPR 4 422 may restore the lead packet to its original form, i.e., the form the lead packet had when the source client 426 sent the lead packet, or as the packet might have been modified by the router 430, such as a result of network address translation (NAT) performed by the router 430. Thus, the lead packet may be restored to a form that does not include any of the modifications made by the waypoints 408, 414 and 418. AIPR 4 422 then forwards the lead packet to the destination service 428. Like AIPR 3 418, AIPR 4 422 stores information in its database identifying AIPR 3 418 as the previous AIPR for this session.

In the second scenario, AIPR 4 422 is not provisioned with information about the destination service 428. In such embodiments, AIPR 4 422 may operate much as AIPR 2 414 and AIPR 3 418 operate. AIPR 4 422 modifies and naturally forwards the lead packet, and the lead packet is eventually delivered to the destination service 428. The destination service 428 responds to the lead packet. For example, if the lead packet is a SYN packet to initiate a TCP session, the destination service 428 responds with an ACK or SYN/ACK packet. AIPR 4 422 recognizes the return packet as being part of the session, such as based on the source client/destination service network address/port number pairs in the return packet. Furthermore, because the return packet was sent by the destination service 428, and not another AIPR, AIPR 4 422 recognizes that it is the last AIPR along the path for this service.

AIPR 4 422 stores information in its database indicating AIPR 4 422 is a terminus AIPR. If AIPR 4 422 receives subsequent packets of the session, AIPR 4 422 may restore the subsequent packets to their original forms, i.e., the forms the subsequent packets had when the source client 426 sent the subsequent packets, or as the packets might have been modified by the router 430, such as a result of network address translation (NAT) performed by the router 430. AIPR 4 422 forwards the subsequent packets to the destination service 428.

AIPR 4 422 modifies the return packet to include a port number on the interface AIPR 4 422 received the lead packet from AIPR 3 418, as well as the network address of AIPR 4 422. AIPR 4 422 then forwards the return packet to AIPR 3 418. Although the return packet may be forwarded by other routers, AIPR 4 422 specifically addresses the return packet to AIPR 3 418. This begins the return packet's journey back along the path the lead packet traveled, through all the waypoints traversed by the lead packet, in reverse order. Thus, the return packet is not naturally routed back to the source client 426. This kind of return packet routing is unlike any routing taught by the prior art known by the inventors.

AIPR 3 418 receives the modified return packet and, because the return packet was addressed to the port number AIPR 3 418 previously assigned and associated with this session, AIPR 3 418 can assume the return packet is part of, or likely part of, the session. To add to the state information in its database, AIPR 3 418 copies the network address and port number of AIPR 4 422 from the return packet into the AIPR's database as the next waypoint for this session. If AIPR 3 418 receives subsequent packets of the session, AIPR 3 418 forwards them to the network address and port number of the next waypoint, i.e., AIPR 4 422.

Thus, once an AIPR is notified of a network address and port number of a next AIPR along a session path, the AIPR forwards subsequent packets to the next AIPR, rather than naturally routing the subsequent packets.

AIPR 3 418 forwards the return packet to AIPR 2 414, whose network address and port number were stored in the database of AIPR 3 418 and identified as the previous waypoint of the session. Likewise, each of the waypoints along the path back to the source client 426 forwards the return packet to its respective previous waypoint.

When the first waypoint, i.e., AIPR 1 408, receives the return packet, the waypoint may restore the return packet to its original form, i.e., the form the return packet had when the destination service 428 sent the return packet, or as the packet might have been modified by the router 430, such as a result of network address translation (NAT) performed by the router 430. Recall that the first waypoint set a flag in its database to indicate the lead packet had not traversed any other waypoint before reaching the first waypoint. This flag is used to signal the first waypoint to restore the return packet and forward the restored return packet to the source client 426. The first waypoint forwards the return packet to the source client 426. Subsequent return packets are similarly handled.

In the third scenario, not shown in FIG. 4, the last AIPR to receive the lead packet has a network address equal to the network address of the destination service. For example, the destination service network address may be given to a gateway router/AIPR, and the gateway router/AIPR may either process the service request or its router table may cause the packet to be forwarded to another node to perform the service. The last AIPR may restore the lead packet and subsequent packets, as described above.

Lead Packet Identification

As noted, a waypoint should be able to identify a lead packet of a session. Various techniques may be used to identify lead packets. Some of these techniques are protocol-specific. For example, a TCP session is initiated according to a well-known three-part handshake involving a SYN packet, a SYN-ACK packet and an ACK packet. By statefully following packet exchanges between pairs of nodes, a waypoint can identify a beginning of a session and, in many cases, an end of the session. For example, A TCP session may be ended by including a FIN flag in a packet and having the other node send an ACK, or by simply including an RST flag in a packet. Because each waypoint stores state information about each session, such as the source client/destination service network address/port number pairs, the waypoint can identify the session with which each received packet is associated. The waypoint can follow the protocol state of each session by monitoring the messages and flags, such as SYN and FIN, sent by the endpoints of the session and storing state information about each session in its database. Such stateful monitoring of packet traffic is not taught by the prior art known to the inventor. Instead, the prior art teaches away from this type of monitoring.

It should be noted that a SYN packet may be re-transmitted—each SYN packet does not necessarily initiate a separate session. However, the waypoint can differentiate between SYN packets that initiate a session and re-transmitted SYN packets based on, for example, the response packets.

Where a protocol does not define a packet sequence to end a session, the waypoint may use a timer. After a predetermined amount of time, during which no packet is handled for a session, the waypoint may assume the session is ended. Such a timeout period may also be applied to sessions using protocols that define end sequences.

Table 2 describes exemplary techniques for identifying the beginning and end of a session, according to various protocols. Similar techniques may be developed for other protocols, based on the definitions of the protocols.

TABLE 2

| Protocol | Destination Port | Technique for Start/End Determination |
|---|---|---|
| TCP | Any | Detect start on the first SYN packet from a new address/port unique within the TCP protocol's guard time between address/port reuse. Following the TCP state machine to determine an end (FIN exchange, RST, or guard timeout). |
| UDP-TFTP | 69 | Trap on the first RRQ or WRQ message to define a new session, trap on an undersized DAT packet for an end of session. |
| UDP-SNMP | 161, 162 | Trap on the message type, including GetRequest, SetRequest, GetNextRequest, GetBulkRequest, InformRequest for a start of session, and monitor the Response for end of session. For SNMP traps, port 162 is used, and the flow of data generally travels in the "reverse" direction. |
| UDP-SYSLOG | 514 | A single message protocol, thus each message is a start of session, and end of session. |
| UDP-RTP | Any | RTP has a unique header structure, which can be reviewed/analyzed to identify a start of a session. This is not always accurate, but if used in combination with a guard timer on the exact same five-tuple address, it should work well enough. The end of session is detected through a guard timer on the five-tuple session, or a major change in the RTP header. |
| UDP-RTCP | Any | RTCP also has a unique header, which can be reviewed, analyzed, and harvested for analytics. Each RTCP packet is sent periodically and can be considered a "start of session" with the corresponding RTCP response ending the session. This provides a very high quality way of getting analytics for RTP/RTCP at a network middle point. |
| UDP-DNS (Nameserver) | 53 | Each DNS query is a single UDP message and response. By establishing a forward session (and subsequent backward session) the AIPR gets the entire transaction. This allows analytics to be gathered and manipulations that are appropriate at the AIPR. |
| UDP-NTP | 123 | Each NTP query/response is a full session. So, each query is a start, and each response is an end. |

Figure 5:
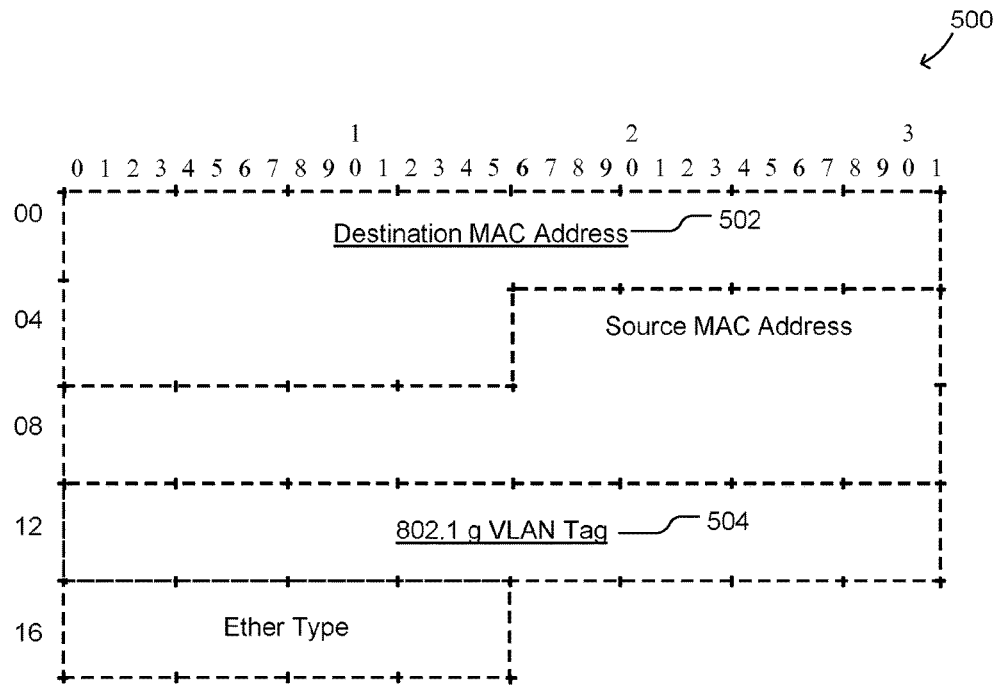
FIG. 5 is a schematic layout of an Ethernet header, identifying fields used for identifying a beginning of a session, according to an embodiment of the present invention.
Figure 6:
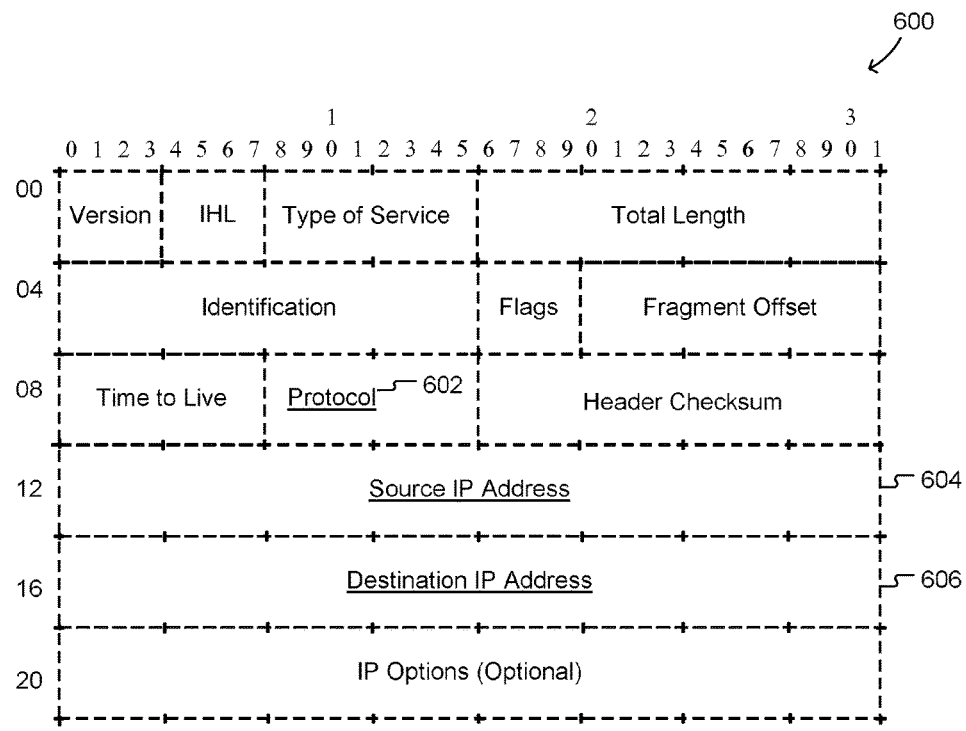
FIG. 6 is a schematic layout of an IP header, identifying fields used for identifying a beginning of a session, according to an embodiment of the present invention.
Figure 7:
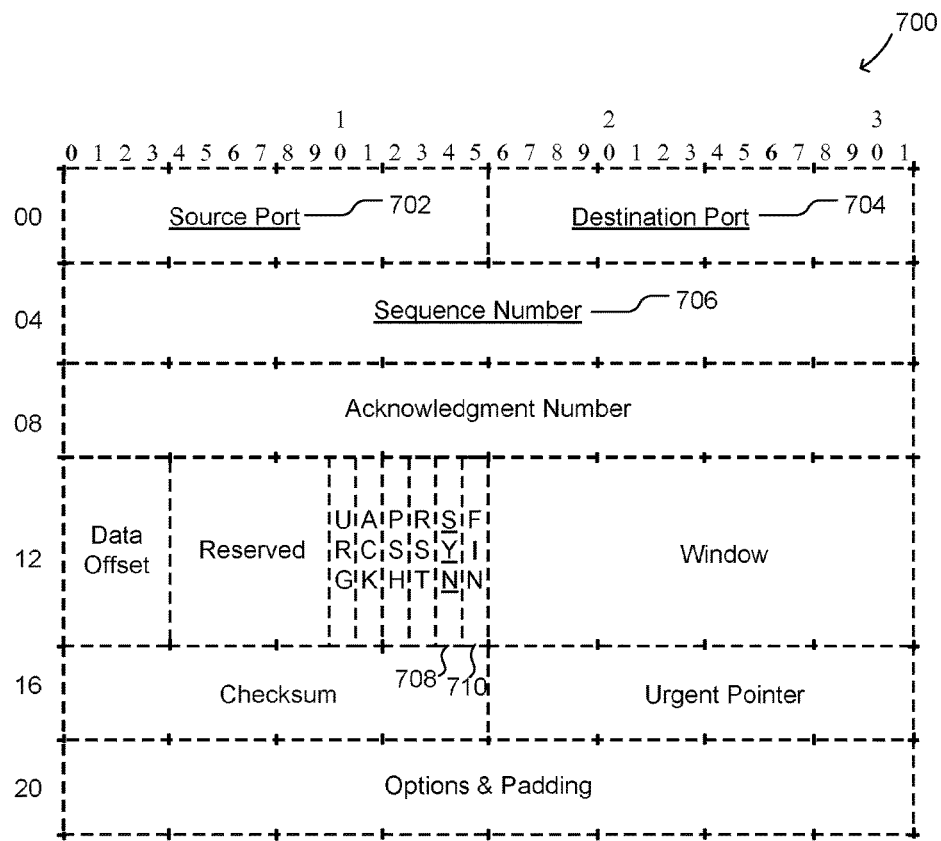
FIG. 7 is a schematic layout of a TCP header, identifying fields used for identifying a beginning of a session, according to an embodiment of the present invention.

FIG. 5 is a schematic layout of an Ethernet header 500, including a Destination MAC Address 502 and an 802.1q VLAN Tag 504 in accordance with illustrative embodiments. FIG. 6 is a schematic layout of an IP header 600, including a Protocol field 602, a Source IP Address 604 and a Destination IP Address 606 in accordance with illustrative embodiments. FIG. 7 is a schematic layout of a TCP header 700, including a Source Port 702, a Destination Port 704, a Sequence Number 706, a SYN flag 708 and a FIN flag 710 in accordance with illustrative embodiments. These packets and the identified fields may be used to identify the beginning of a session, as summarized in Table 3.

TABLE 3

| Data Item | Where From | Description |
| --- | --- | --- |
| Physical Interface | Ethernet Header | This is the actual port that the message was received on, which can be associated or discerned by the Destination MAC Address |
| Tenant | Ethernet Header OR Source MAC Address & Previous Advertisement | Logical association with a group of computers. |
| Protocol | IP Header | This defines the protocol in use and, for the TCP case, it must be set to a value that corresponds to TCP |
| Source IP Address | IP Header | Defines the source IP Address of the initial packet of a flow. |
| Destination IP Address | IP Header | Defines the destination IP Address of the initial packet of a flow. |
| Source Port | TCP Header or UDP Header | Defines the flow instance from the source. This may reflect a client, a firewall in front of the client, or a carrier grade NAT. |
| Destination Port | TCP Header or UDP Header | This defines the desired service requested, such as 80 for HTTP. |
| Sequence Number | TCP Header | This is a random number assigned by the client. It may be updated by a firewall or carrier grade NAT. |
| SYN Bit On | TCP Header | When the SYN bit is on, and no others, this is an initial packet of a session. It may be retransmitted if there is no response to the first SYN message. |

Augmented IP Router (AIPR)

Figure 8:
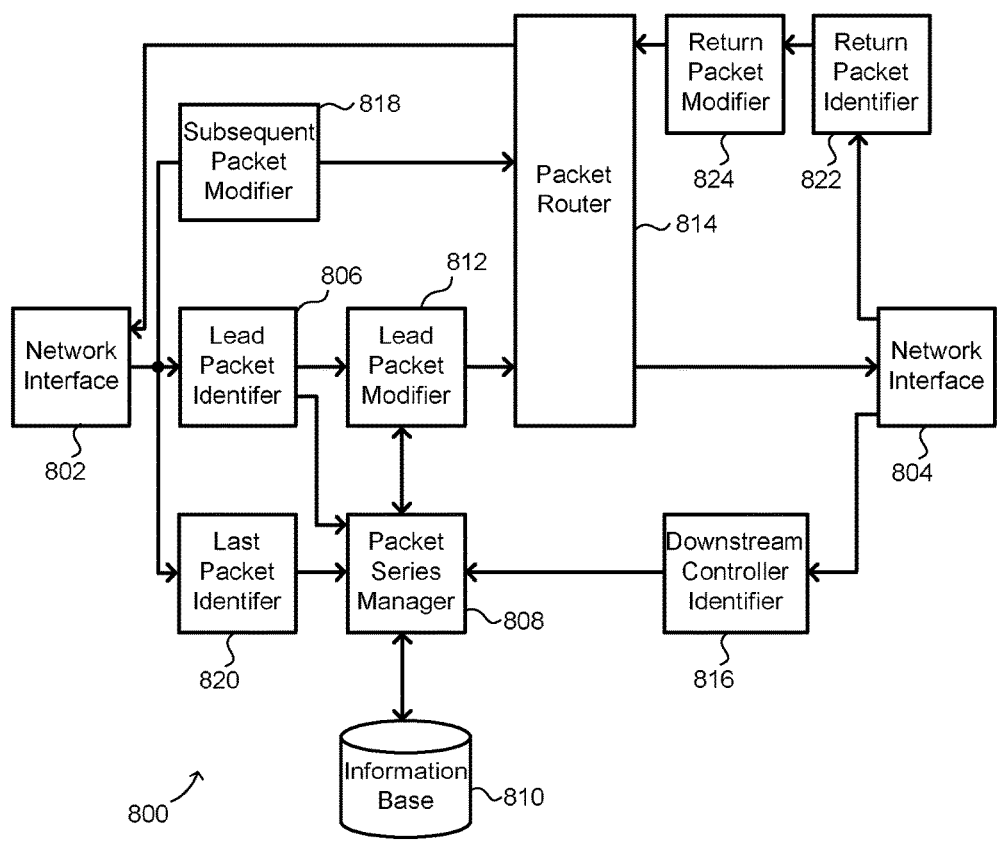
FIG. 8 is a schematic block diagram of an AIPR of FIG. 4, according to an embodiment of the present invention.

FIG. 8 is a schematic block diagram of an AIPR (waypoint) 800 configured in accordance with illustrative embodiments of the invention. This diagram is intended to show some parts of the AIPR 800 and thus, does not show all of its parts. Subsequent figures may show other parts that may be in this AIPR 800, or in an AIPR configured in accordance with other embodiments. The AIPR 800 includes at least two network interfaces 802 and 804, through which the AIPR 800 may be coupled to two networks. The interfaces 802 and 804 may be, for example, Ethernet interfaces. The AIPR 800 may send and receive packets via the interfaces 802 and 804.

A lead packet identifier 806 automatically identifies lead packets, as discussed herein. In general, the lead packet identifier 806 identifies a lead packet when the lead packet identifier 806 receives a packet related to a session that is not already represented in the AIPR's information base 810, such as a packet that identifies a new source client/destination service network address/port number pair. As noted, each lead packet is an initial, non-dropped, packet of a series of packets (session). Each session typically includes a lead packet and at least one subsequent packet. The lead packet and all the subsequent packets are sent by the same source client toward the same destination service, for forward flow control. For forward and backward flow control, all the packets of the session are sent by either the source client or the destination service toward the other.

A session (packet series) manager 808 is coupled to the lead packet identifier 806. For each session, the session manager assigns a unique identifier. The unique identifier may be, for example, a combination of the network address of the AIPR 800 or of the interface 802, in combination with a first port number assigned by the session manager 808 for receiving subsequent packets of this session. The unique identifier may further include the network address of the AIPR 800 or of the other interface 804, in combination with a second port number assigned by the session manager 808 for transmitting the lead packet and subsequent packets. This unique identifier is associated with the session. The session manager 808 stores information about the session in an information base 810. This information may include the unique identifier, in association with the original source client/destination service network address/port number pairs.

Figure 9:
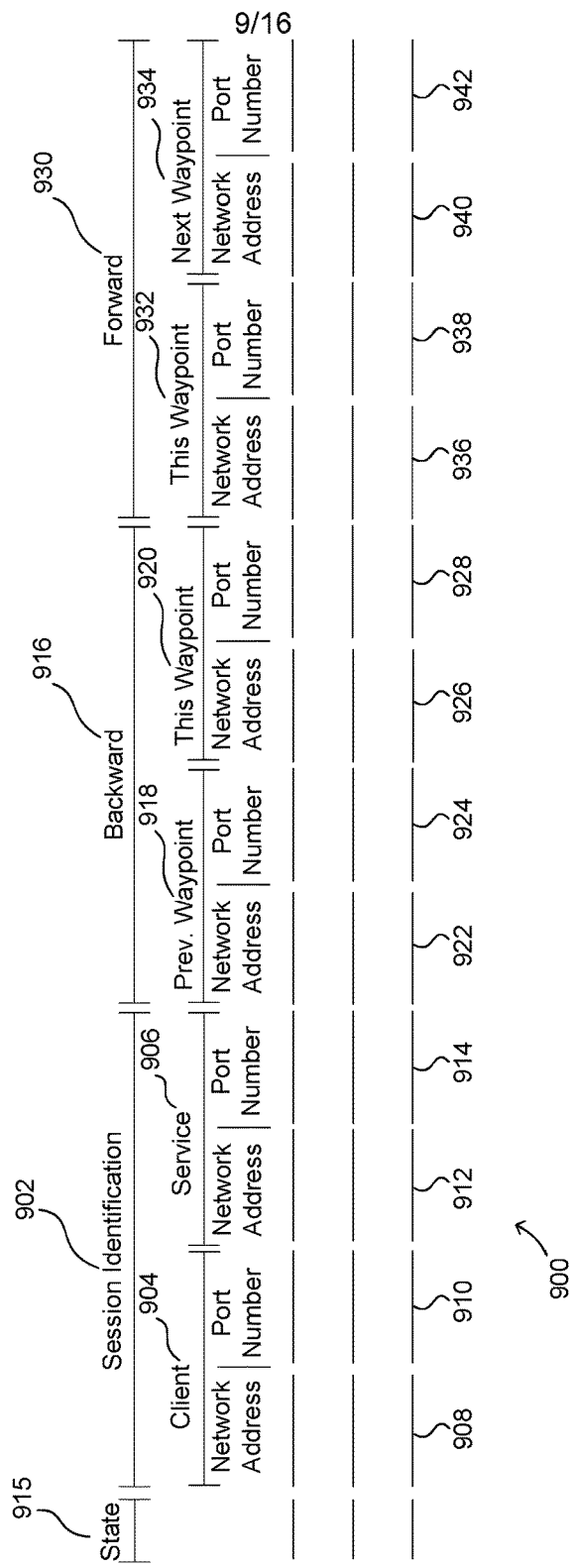
FIG. 9 is a schematic illustration of information stored in an information base by the AIPR of FIGS. 4 and 8, according to an embodiment of the present invention.

FIG. 9 is a schematic layout of an exemplary waypoint information base 900 and some of the state information it contains. Each row represents a session and thus, includes state information about that session. A session identification column 902 thus includes sub-columns for the source client 904 and the destination service 906. For each client 904, its network address 908 and port number 910 are stored. For each destination service 906, its network address 912 and port number 914 are stored. This information is extracted from the lead packet.

Additional state information about the session may be stored in a state column 915. This information may be used to statefully follow a series of packets, such as when a session is being initiated or ended.

A backward column includes sub-columns for storing information 916 about a portion of the backward path, specifically to the previous AIPR. The backward path information 916 includes information 918 about the previous AIPR and information 920 about the present AIPR 800. The information 918 about the previous AIPR includes the AIPR's network address 922 and port number 924. The session manager 808 extracts this information from the lead packet, assuming the lead packet was forwarded by an AIPR. If, however, the present AIPR 800 is the first AIPR to process the lead packet, the information 918 is left blank as a flag. The information 920 about the present AIPR 800 includes the network address 926 of the interface 802 over which the lead packet was received, as well as the first port number 928 assigned by session manager 808.

The waypoint information base 900 is also configured to store information 930 about a portion of the forward path, specifically to the next AIPR. This information 930 includes information 932 about the present AIPR 800 and information 934 about the next AIPR along the path, assuming there is a next AIPR. The information 932 includes the network address 936 of the interface over which the present AIPR will send the lead packet and subsequent packets, as well as the second port number 938 assigned by the session manager 808. The information 934 about the next AIPR along the path may not yet be available, unless the AIPR is provisioned with information about the forward path. The information 934 about the next AIPR includes its network address 940 and port number 942. If the information 934 about the next AIPR is not yet available, the information 934 may be filled in when the AIPR 800 processes a return packet, as described below.

Some embodiments of the waypoint information base 900 may include the forward information 930 without the backward information 916. Other embodiments of the waypoint information base 900 may include the backward information 916 without the forward information 930.

Returning to FIG. 8, a lead packet modifier 812 is coupled to the session manager 808. The lead packet modifier 812 modifies the lead packet to store the unique identifier associated with the session. The original source client network address/port number pair, and the original destination service network address/port number pair, are stored in the modified lead packet, if necessary. The lead packet may be enlarged to accommodate the additional information stored therein, or existing space within the lead packet, such a vendor specific attribute field, may be used. Other techniques for transmitting additional information are protocol specific, for example with TCP, the additional information could be transmitted as a TCP Option field, or added to the SYN packet as data. In either case, the term session data block is used to refer to the information added to the modified lead packet.

Figure 10:
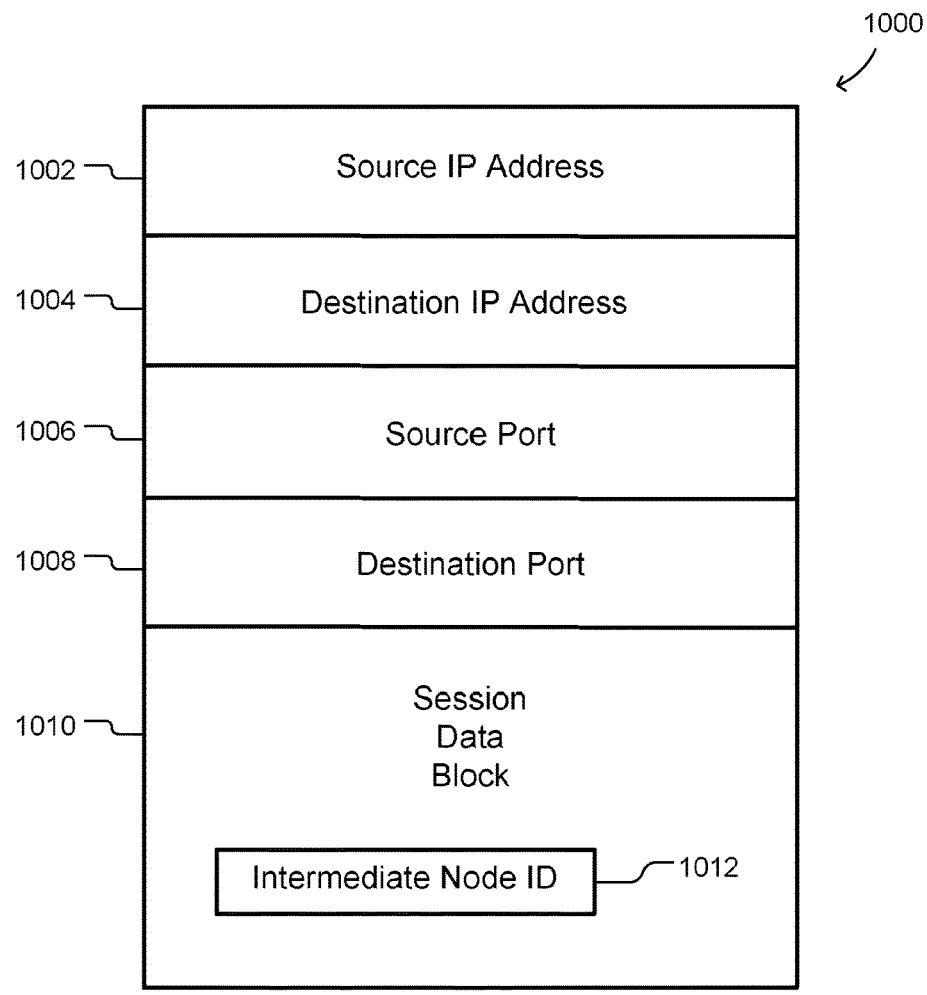
FIG. 10 is a schematic diagram of a modified lead packet produced by the AIPR of FIGS. 4 and 8, according to an embodiment of the present invention.

FIG. 10 is a schematic diagram of an exemplary modified lead packet 1000 showing the original source and destination IP addresses 1002 and 1004, respectively, and the original source and destination port numbers 1006 and 1008, respectively. FIG. 10 also shows a session data block 1010 in the modified lead packet 1000. Although the session data block 1010 is shown as being contiguous, it may instead have its contents distributed throughout the modified lead packet 1000. The session data block 1010 may store an identification of the sending AIPR, i.e., an intermediate node identifier 1012, such as the network address of the second network interface 804 and the second port number.

Returning to FIG. 8, the lead packet modifier 812 updates the packet length, if necessary, to reflect any enlargement of the packet. The lead packet modifier 812 updates the checksum of the packet to reflect the modifications made to the packet. The modified lead packet is then transmitted by a packet router 814, via the second network interface 804. The modified lead packet is naturally routed, unless the AIPR 800 has been provisioned with forward path information as discussed below.

Eventually, the destination service sends a return packet. The AIPR 800 receives the return packet via the second interface 804. If another AIPR (downstream AIPR) between the present AIPR 800 and the destination service handles the lead packet and the return packet, the downstream AIPR modifies the return packet to include the downstream AIPR's network address and a port number. A downstream controller 816 identifier uses stateful inspection, as described herein, to identify the return packet. The downstream controller 816 stores information 934 (FIG. 9), specifically the network address and port number, about the next AIPR in the waypoint information base 900.

The present AIPR 800 may use this information to address subsequent packets to the next AIPR. Specifically, a subsequent packet modifier 818 may set the destination address of the subsequent packets to the network address and port number 940 and 942 (FIG. 9) of the next waypoint, instead of directly to the destination service. The packet router 814 sends the subsequent packets, according to their modified destination addresses. Thus, for each series of packets, subsequent packets flow through the same downstream packet flow controllers as the lead packet of the series of packets.

A last packet identifier 820 statefully follows each session, to identify an end of each stream, as discussed above. As noted, in some cases, the end is signified by a final packet, such as a TCP packet with the RST flag set or a TCP ACK packet in return to a TCP packet with the FIN flag set. In other cases, the end may be signified by a timer expiring. When the end of a session is detected, the packet series manager 808 disassociates the unique identifier from the session and deletes information about the session from the waypoint information base 900.

Where the AIPR 800 is provisioned to be a last AIPR before a destination service, the lead packet modifier 806 restores the lead packet to the state the lead packet was in when the source client sent the lead packet, or as the lead packet was modified, such as a result of network address translation (NAT). Similarly, the subsequent packet modifier 818 restores subsequent packets.

Similarly, if the destination address of the lead packet is the same as the network address of the AIPR 800, or its network interface 802 over which it receives the lead packets, the lead packet modifier 806 and the subsequent packet modifier 818 restore the packet and subsequent packets.

As noted, in some protocols, several packets are required to initiate a session, as with the SYN-SYN/ACK-ACK handshake of the TCP. Thus, the downstream controller identifier 816 may wait until a second return packet is received from the destination service before considering a session as having started.

As noted, some embodiments of the waypoint 800 also manage return packet paths. The lead packet identifier 806 automatically ascertains whether a lead packet was forwarded to the waypoint 800 by an upstream waypoint. If the lead packet includes a session data block, an upstream waypoint forwarded the lead packet. The packet series manager 808 stores information about the upstream waypoint in the waypoint information base 810. A return packet identifier 822 receives return packets from the second network interface 804 and automatically identifies return packets of the session. These return packets may be identified by destination address and port number being equal to the information 932 (FIG. 9) in the waypoint information base corresponding to the session. A return packet modifier modifies the return packets to address them to the upstream waypoint for the session, as identified by the information 918 in the waypoint information base 900.

It should be noted that statefully monitoring packets is not done by conventional routers. The prior art known to the inventors teaches away from routers statefully monitoring packets. Statefully monitoring packets is, however, one embodiment of the disclosed waypoint. This type of monitoring distinguishes embodiments of the present invention from the prior art.

Figure 11:
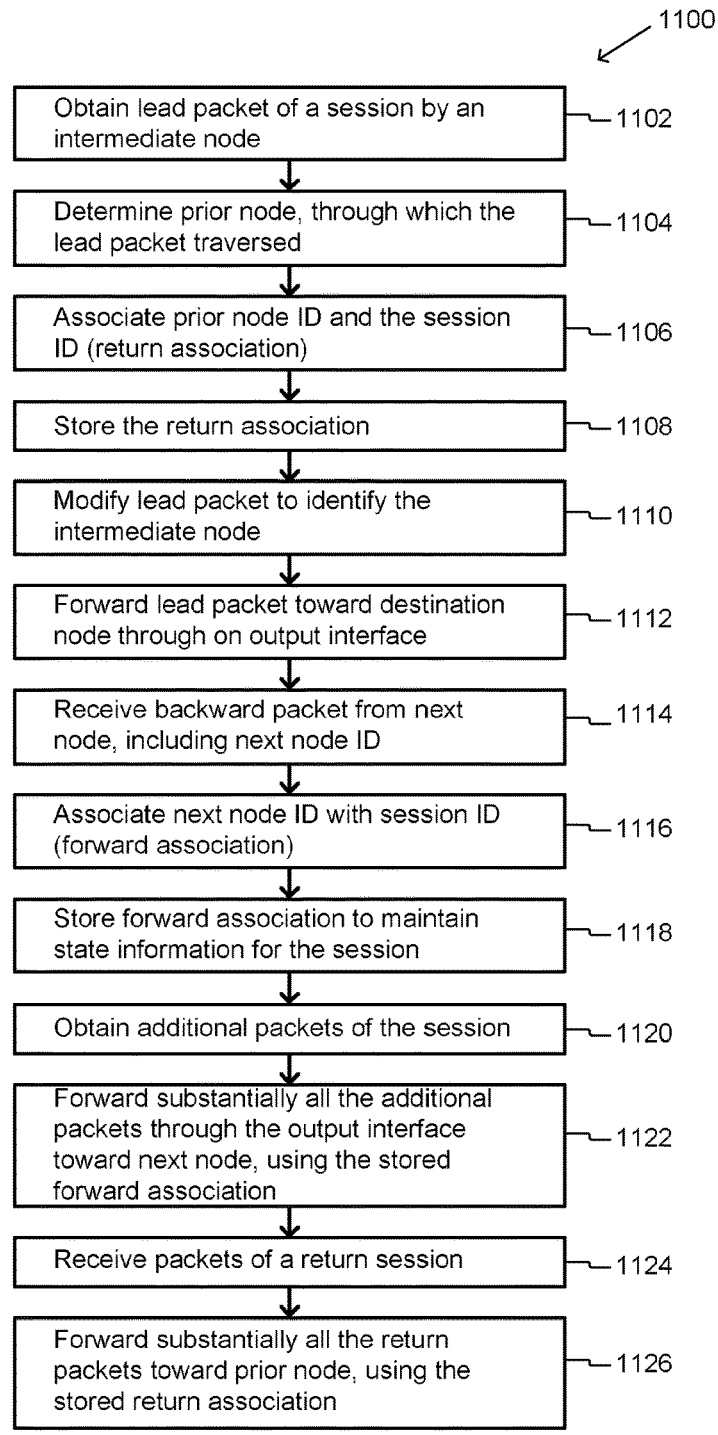
FIGS. 11 and 12 contain flowcharts schematically illustrating operations performed by the AIPR of FIGS. 4 and 8, according to an embodiment of the present invention.

FIG. 11 contains a flowchart 1100 schematically illustrating some operations performed by the AIPR 800 (FIG. 8) in accordance with illustrative embodiments of the invention. The flowchart 1100 illustrates a packet routing method for directing packets of a session from an originating node toward a destination node in an IP network. In this embodiment, the lead packet is naturally routed, although other embodiments discussed below do not naturally route the lead packet. At 1102, an intermediate node obtains a lead packet of a plurality of packets in a session. The intermediate node may include a routing device or a switching device that performs a routing function.

The packets in the session have a unique session identifier. At 1104, a prior node, through which the lead packet traversed, is determined. The prior node has a prior node identifier. At 1106, a return association is formed between the prior node identifier and the session identifier. At 1108, the return association is stored in memory to maintain state information for the session.

At 1110, the lead packet is modified to identify at least the intermediate node. At 1112, the lead packet is forwarded toward the destination node though an intermediate node electronic output interface to the IP network. The electronic output interface is in communication with the IP network. At 1114, a backward message (e.g., a packet, referred to as a "backward packet") is received through an electronic input interface of the intermediate node. The backward message is received from a next node. The next node has a next node identifier. The backward message includes the next node identifier and the session identifier. The electronic input interface is in communication with the IP network.

At 1116, a forward association is formed between the next node identifier and the session identifier. At 1118, the forward association is stored in memory, to maintain state information for the session. At 1120, additional packets of the session are obtained. At 1122, substantially all of the additional packets in the session are forwarded toward the next node, using the stored forward association. The additional packets are forwarded through the electronic output interface of the intermediate node.

At 1124, a plurality of packets is received in a return session, or a return portion of the session, from the destination. The return session is addressed toward the originating node. At 1126, substantially all the packets in the return session are forwarded toward the prior node, using the stored return association. The packets are forwarded through the electronic output interface.

Figure 12:
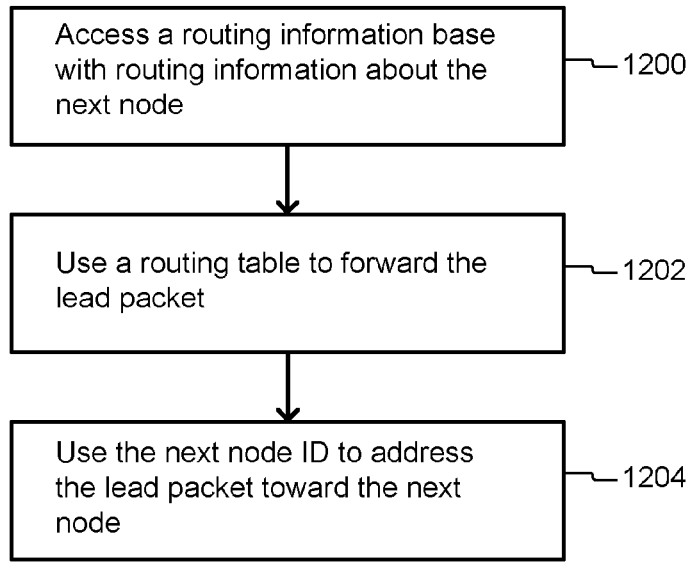

As shown at 1200 in FIG. 12, forwarding the lead packet 1112 toward the destination node may include accessing a routing information base having routing information for the next node. As shown at 1202, the intermediate node may have a routing table, and forwarding the lead packet 1112 toward the destination node may include using the routing table to forward the lead packet toward the destination node. As shown at 1204, forwarding the lead packet 1112 toward the destination node may include using the next node identifier to address the lead packet toward the next node.

The lead packet may be addressed so that a plurality of network devices receive the lead packet after it is forwarded and before the next node receives the lead packet. For example, if a first node forwards a lead packet to a second, adjacent node, devices in the Internet between first and second nodes can receive the lead packet before the second node receives that same lead packet.

An AIPR 800 and all or a portion of its components 802-824 may be implemented by a processor executing instructions stored in a memory, hardware (such as combinatorial logic, Application Specific Integrated Circuits (ASICs), Field-Programmable Gate Arrays (FPGAs) or other hardware), firmware or combinations thereof.

Forming the Ordered Path in Advance

Various embodiments discussed above form the noted ordered path of nodes between the source/originating node to the destination node/service node using natural routing. Accordingly, such embodiments do not necessarily select a more efficient, faster, reliable, or optimal path from a load balancing perspective. Such natural routing embodiments therefore may select an ordered path of nodes that is inefficient or even ineffective. For example, the ordered path may drop packets, have a lot of congestion, or have a high cost. Illustrative embodiments seek to mitigate those and related problems by taking advantage of the state information in the node routing databases to select a more optimal ordered path of nodes from end-to-end.

More specifically, an intermediate node (e.g., a routing device) may use the state information in its database, such as utilization of AIPRs/nodes in the network (e.g., node congestion) to pre-select an ordered path that has optimal features—however those optimal path features are defined. The intermediate node also may use the cost of various links in the network between the AIPRs/nodes to pre-select an ordered path. For example, if low cost is paramount, then the intermediate node may form a lowest cost path. Alternatively, if reliability is paramount, then the intermediate node may form a more reliable path. If both low cost and reliability are paramount in some specific proportion to each other, then the intermediate node may form a path that has qualities of low cost and reliability. Indeed, while these goals are sought, in practice, the dynamic nature of networks may reduce the effectiveness of some of these ordered paths. The inventors nevertheless expect that such pre-selected ordered paths will improve performance in a majority of cases.

Figure 13:
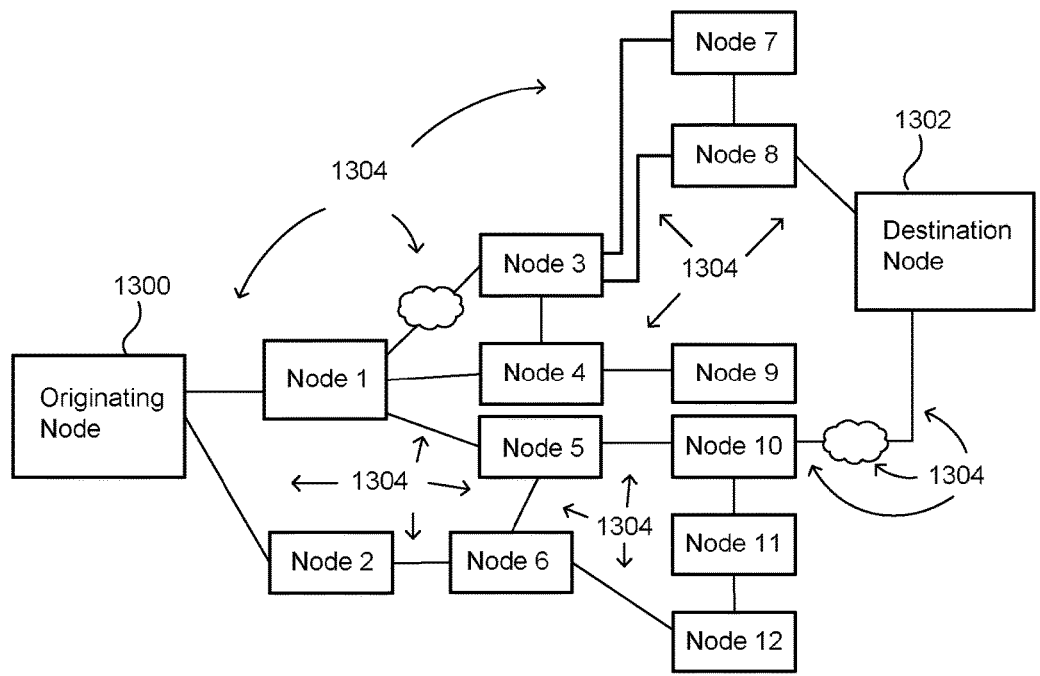
FIG. 13 is a schematic illustration of a network across which illustrative embodiments may forward packets.

FIGS. 13-16 illustrate this path pre-selection embodiment. In particular, FIG. 13 schematically shows another exemplary network across which illustrative embodiments may forward packets. As shown, this network includes an originating node 1300 that generates a request for services from a destination node 1302 across a larger network (e.g., the Internet). To that end, the larger network includes a plurality of AIPRs/nodes (identified as Node 1, Node 2 . . . Node 12) and corresponding links 1304 that logically connect both end nodes 1300 and 1302.

Specifically, the originating node 1300 connects to two nodes, Node 1 and Node 2 of this figure, though a link (this and other links in FIG. 13 are generally identified by reference number "1304"), which may include a direct connection (e.g., through a LAN or direct connection), or a virtual connection through a larger network (e.g., the Internet) using a stateless Layer 3 protocol or stateful protocol. FIG. 13 shows a cloud within just two links 1304 to highlight such a virtual connection. Those two clouds, however, should not be construed to mean that only those two links 1304 are virtual links Other nodes downstream of Nodes 1 and 2 also are directly or virtually connected with the larger network.

Figure 14:
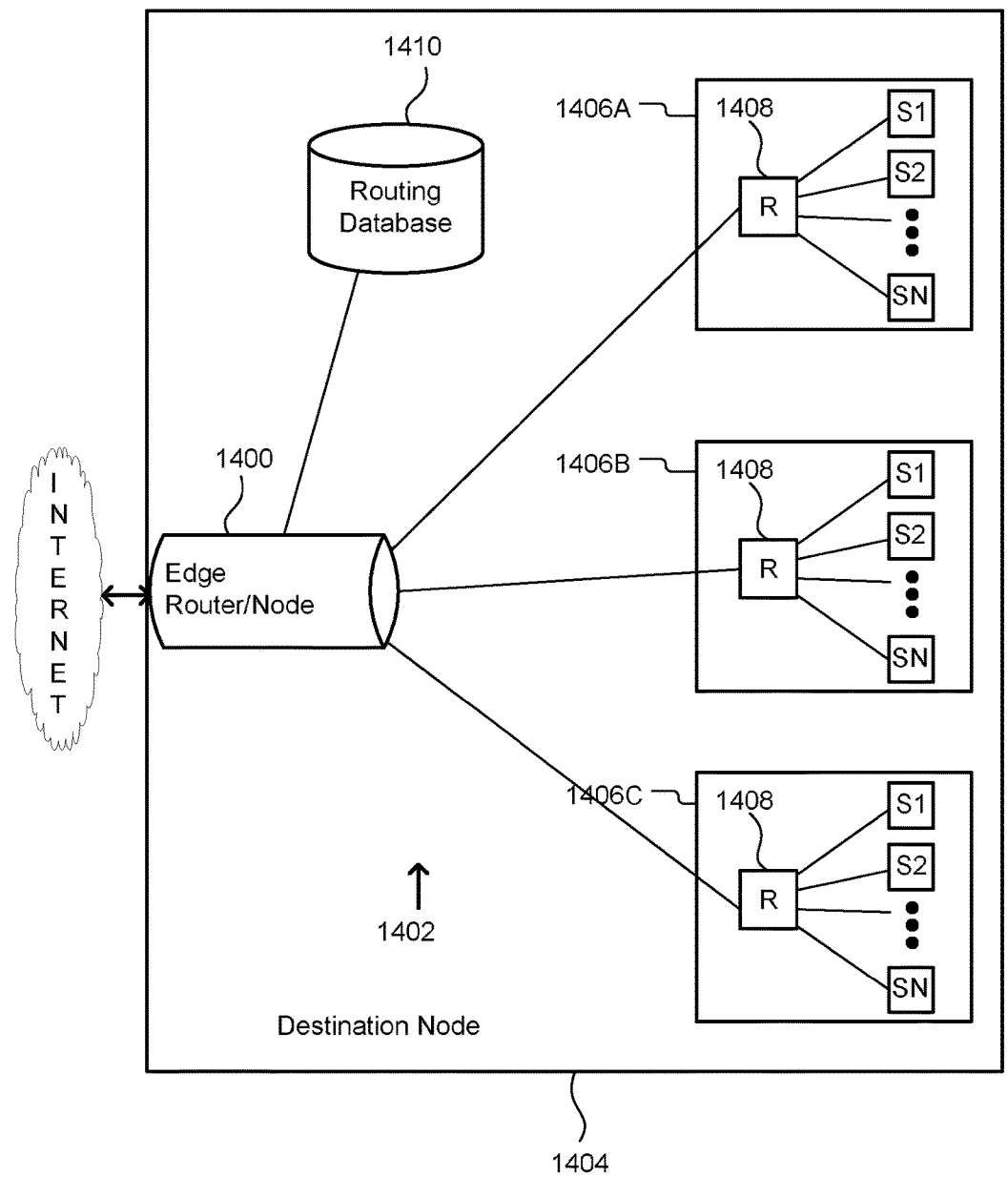
FIG. 14 is a schematic illustration of a datacenter or similar destination that may receive packets in illustrative embodiments of the invention.

Among other things, the destination node 1302 may include a single device for providing a service, or part of a LAN that provides a service. FIG. 14 schematically shows one embodiment of the latter case, in which the destination node 1302 includes an edge node/edge router 1400 at the edge of a LAN 1402. For example, the LAN 1402 may be part of a datacenter 1404 having an internal topology and structure that is largely unknown/opaque to exterior devices/nodes. Accordingly, all requests for service from this LAN 1402 are received by the edge node (or one of a plurality of similar edge nodes) that determines how to forward the requests to an appropriate end point in its LAN 1402. In this case, either or both the entire datacenter 1404 or the edge router 1400 may be considered the destination node 1302.

To those ends, the destination node 1302 includes the noted edge router 1400 with an electronic network interface for connecting to the larger network of FIG. 13. FIG. 14 simply schematically shows this larger network as "Internet." The datacenter 1404 also includes a plurality of servers, racks, or other devices 1406A-1406C with routers 1408 that each directs network traffic, such as packets, to one or more of a plurality of services designated as S1, S2, . . . SN. The routers 1408 and services S1-SN may take on any of a variety of different configurations, such as by having multiple redundant hardware and/or virtual routers, and different known technologies for interconnecting with other functional devices in the datacenter 1404. In this example, the datacenter 1404 has three devices 1406A-1406C that each have the services S1, S2, . . . SN. Although the services S1, S2, . . . SN may be the same across each device 1406A-1406C (i.e., service S1 is the same across all three devices 1406A-C), some embodiments may have different services across the different devices 1406A-1406C. To ensure appropriate routing, the datacenter 1404 also has a routing database 1410 containing routing information both inside and outside the datacenter 1404. The routing database 1410 may be part of the AIPR, or, in alternative embodiments, an independent entity in the datacenter 1404.

Figure 15:
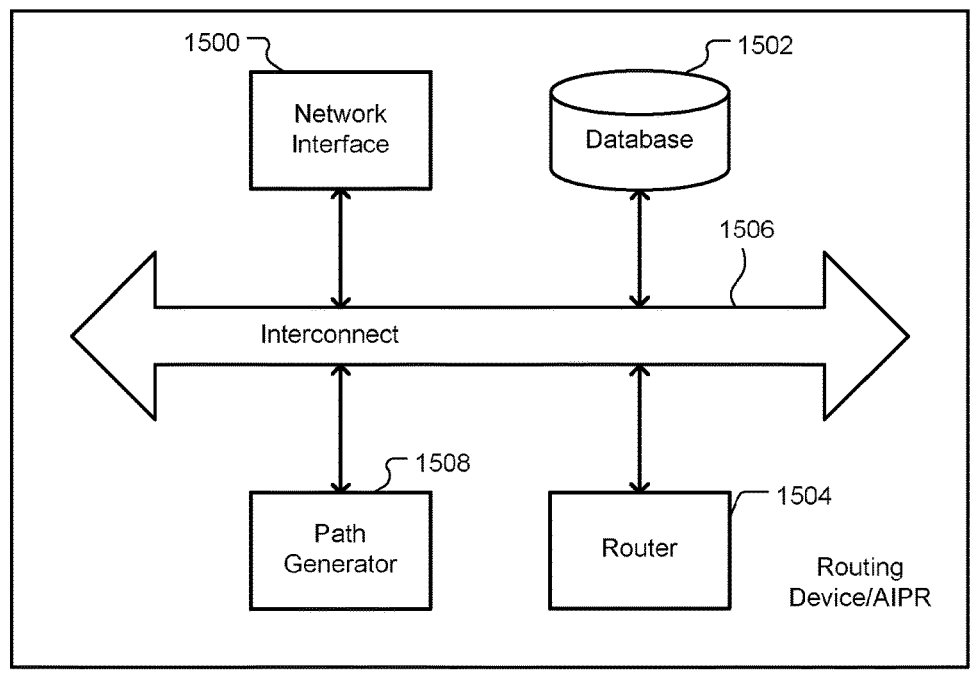
FIG. 15 is another schematic block diagram of an AIPR according to illustrative embodiments of the present invention.

The intermediate node has a plurality of specially configured and conventional functional components that generate the balanced, preferred ordered path of nodes through the network. FIG. 15 schematically shows another embodiment of an AIPR/intermediate node/routing device having some such components. As with other embodiments of the AIPR/intermediate node/routing device, such as that shown in FIG. 8, this embodiment only shows a few components for simplicity purposes only. Indeed, this embodiment can have similar or the same functional operatively connected components as those of the embodiment of FIG. 8. For example, in a manner similar to the embodiment of FIG. 8, this embodiment has one or more network interfaces 1500, a routing/information database 1502, and a router 1504. This embodiment also has an internal interconnection structure 1506 that permits intra-node component communication. In the embodiment of FIG. 8, this interconnect is shown as lines between components, while FIG. 15 graphically shows this interconnection structure 1506 as a bus. Both are simply general representations of an interconnection apparatus within the routing device/node. Such representations are not necessarily intended to imply that one functional component is directly or indirectly coupled to the other, or that only a bus is used.

In addition to the common components, the AIPR of FIG. 15 also has a path generator 1508 that, for each session, predefines the ordered path of nodes between the originating node 1300 and the destination node 1302. As noted above and discussed in greater detail below, the path generator 1508 at least uses state information relating to the nodes in the network to select a pre-defined path between the two end nodes 1300 and 1302.

Figure 16:
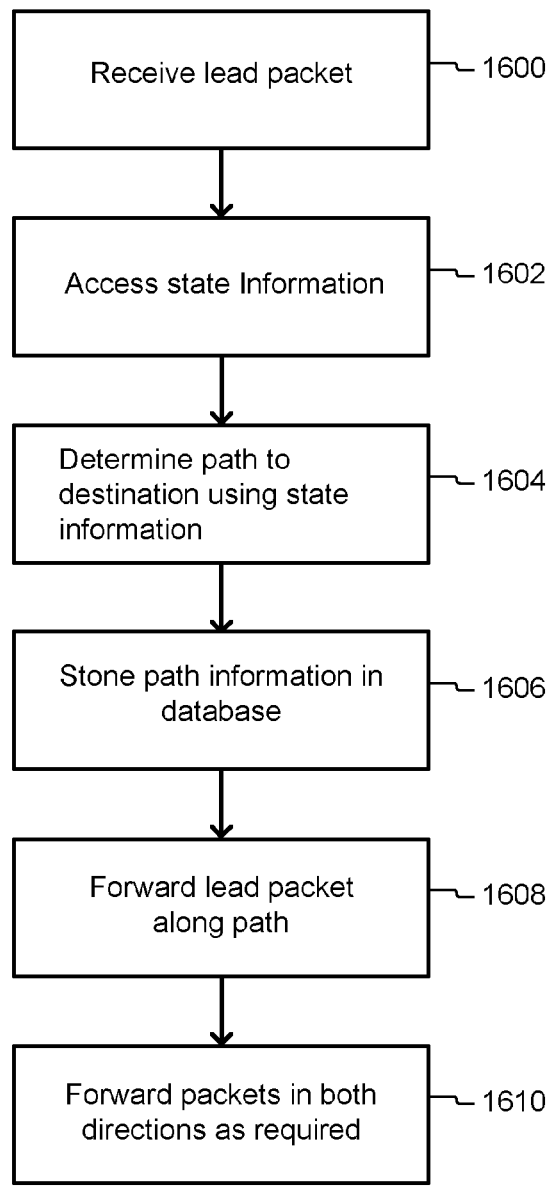
FIG. 16 contains a flowchart schematically illustrating a process of forming an ordered path using state information.

To that end, FIG. 16 contains a flowchart schematically illustrating a process of forwarding packets of a given session along an ordered path using state information. For exemplary purposes, this process is discussed using the networks of FIGS. 13 and 14. It should be noted, however, that this process is substantially simplified from a longer process that normally would be used to statefully forward packets of a session between the originating node 1300 and the destination node 1302. Accordingly, the process can include many steps that which those skilled in the art likely would use. In addition, some of the steps may be performed in a different order than that shown, or at the same time. Those skilled in the art therefore can modify the process as appropriate. Moreover, as noted above and below, the topology and configurations of the network and databases are merely examples of a wide variety of different topologies and configurations that may be used. Those skilled in the art can use different topologies and configurations depending upon the application and other constraints.

The process begins at step 1600, in which an intermediate network device (i.e., an AIPR) receives a lead packet, of a given session, that originated from the originating node 1300. Receipt of this packet prompts or starts the process of forming the stateful ordered path between the originating node 1300 and the destination node 1302.

In illustrative embodiments, the intermediate node is close to the originating node 1300; preferably next to the originating node 1300. As explained above, a node is considered to be "next to" or "adjacent" to another node when it is the next one in the ordered set of nodes to receive a packet. In FIG. 13, for example, an ordered set of nodes may consist of:

Originating Node-Node 1-Node 4-Node 3-Node 8-Destination Node.

In that example, Node 1 is considered to be adjacent to the originating node 1300. Node 4, however, is two nodes away from the originating node 1300 and thus, would not be an appropriate node to pre-define the ordered path in this implementation. Alternative embodiments, however, may use path nodes that are not adjacent to the originating node 1300 to set the ordered path. For example, in that embodiment, Node 4 or Node 3 of the prior exemplary ordered path could form the remainder of the path to the Destination Node.

Continuing with the example of FIG. 13, assume that Node 1 has received the lead packet. Such node thus begins the process of forming the path and forwarding the appropriate packets in this given session. To that end, Node 1 accesses state information relating to the nodes in the network. As noted above, all or many of the nodes in the network advertise their state information and related routing information to other nodes in the network, thus permitting all the nodes receiving this information to maintain up-to-date local routing databases.

In this case, Node 1 accesses its local routing database 1502 (also referred to as a "waypoint information base") to determine the state of some or all of the nodes in the network (step 1602). To that end, the path generator 1508 of Node 1 may retrieve state information for some or all of Nodes 2-12 (or all nodes except for Node 2 because Node 1 and Node 2 are not directly coupled without an intervening intermediate node). Among other things, for each session handled by each node, that state information may include the next node/waypoint, the previous node/waypoint, the session identifier, the identities of the originating node 1300 and destination node 1302 of that session, and the number of stateful sessions the node is handling. For example, Node 4 may be a part of an ordered path for 20 active sessions. The state information thus may include the next node and previous node for each of the 20 sessions of Node 4, as well as the originating and destination nodes of all those sessions. In addition, the path generator 1508 of Node 1 also could retrieve related load balancing information, such as the cost associated with different links 1304 and nodes in the network, link capacities, and current flow.

Based on the state information and load balancing information, the path generator 1508 of Node 1 determines the appropriate path from Node 1 to the destination node 1302. In other words, the path generator 1508 use at least the state information, and, in some embodiments, the load balancing information, to select all downstream nodes to the destination node 1302. For example, among other paths, the path generator 1508 may select any of the below set of stateful, ordered paths to the destination node 1302:

(1) Node 1-Node 3-Node 7-Node 8-Destination Node 1302

(2) Node 1-Node 3-Node 8-Destination Node 1302

(3) Node 1-Node 4-Node 3-Node 8-Destination Node 1302

(4) Node 1-Node 5-Node 10-Destination Node 1302

Indeed, the four stateful ordered paths listed above are examples and not intended to suggest they are the only stateful ordered paths. Thus, packets in a given session travel in the order of the nodes between Node 1 and the destination node 1302. Of course, on the backward path, packets take the reverse order and hop to the originating node 1300 after Node 1. For example, using ordered path 1, the packets of the session traverse from the originating node 1300, to Node 1, Node 3, Node 7, Node 8, and then to the destination node 1302. Node 3 and Node 7 are considered to be adjacent in this path. Node 1 and Node 7 are not considered to be adjacent in this path. Step 1604 therefore concludes by selecting one of these ordered paths (or another path not shown) based on the state information and/or the load balancing information in the database 1502.

The process continues to step 1606, which stores the selected path information in the database 1502. At some point, Node 1 may broadcast or multicast this new path and session to other routing devices or nodes in the network so they can update their routing databases. Next, the router 1504 in the routing device forwards the lead packet along the selected path via the electronic interface 1500 (step 1608). Nodes in the selected path downstream of Node 1 (with regard to the lead packet) thus receive the lead packet in the manner described above, update their local databases, and continue forwarding the lead packet to the next node.

The other nodes in the path may receive the ordered path information in any of a plurality of different manners. As noted above, they may receive it in a simple broadcast or multicast. Alternatively, the lead packet may be altered in a manner similar to that described above. Accordingly, a next receiving downstream node (e.g., Node 3) may receive the lead packet and determine from its addressing or other contents that it is a lead packet in a given session. This downstream node (e.g., Node 3) may also ascertain from the lead packet 1) that such node was selected to be part of the ordered set of nodes (set (1) above) of the given path of this session, and 2) the identity of the next node (e.g., Node 7) in the ordered path. Accordingly, this downstream node may forward the lead packet to the next node in the ordered path (e.g., Node 7), which repeats this process to forward the lead packet to the next node (e.g., Node 8). The destination node 1302 may detect that it is the last node and consequently remove the additional information that was used to form this path. In that case, the destination node 1302 stores the previous node in its database 1502 (e.g., Node 8), and thus, has the capability to forward return packets for this given session back to Node 8, which continues forwarding the packets along the given path to the originating node 1300.

The process concludes at step 1610, which forwards packets in both directions along the ordered path as required by the originating node 1300 and the destination node 1302. For example, the originating node 1300 may request a video from a service S1-SN inside the datacenter 1404. Accordingly, now that the ordered path is formed, the originating node 1300 may forward a first set of packets requesting the video. The destination node 1302 or edge router 1400 in the datacenter 1404 of FIG. 14 thus receives that request, and responsively accesses its local routing database 1502 to determine the appropriate service S1-SN to receive the request. Based on the information it receives from the routing database 1502, the edge router 1400 forwards the request to one of the services S1-SN via one of the noted computing devices. For example, the request packets may be forwarded to Service S2 via the local router 1408 in the top device 1406A of FIG. 14.

Service S2 responsively may send packets representing the video back through its local router 1408, to the edge router 1400, and out to the network. The packets in the video stream in this session thus traverse through the network to the originating node 1300 in reverse order in which the request was directed. For example, if path (1) above is used, then the video packets of the return path traverse the network along the ordered path of nodes in the following order:

Node 8-Node 7-Node 3-Node 1-Originating Node 1300

After receipt of the return packets, each node recognizes that the packets are return packets and that they belong to the given session. Accordingly, these nodes simply access their local databases 1502 as noted above to forward the return packets to the next downstream node (downstream from the perspective of this packet direction).

Illustrative embodiments thus more effectively load balance a network; they use state information relating to nodes in a typically stateless network (e.g., an IP network) to form a stateful, ordered path between an originating node 1300 and a destination node 1302. As a result, packets should route more efficiently through the otherwise stateless network without the need for load balancing devices, which typically are dedicated devices resident at the edge of a LAN or other network.

While the invention is described through the above-described exemplary embodiments, modifications to, and variations of, the illustrated embodiments may be made without departing from the inventive concepts disclosed herein. Furthermore, disclosed aspects, or portions thereof, may be combined in ways not listed above and/or not explicitly claimed. Accordingly, the invention should not be viewed as being limited to the disclosed embodiments.

Although aspects of embodiments may be described with reference to flowcharts and/or block diagrams, functions, operations, decisions, etc. of all or a portion of each block, or a combination of blocks, may be combined, separated into separate operations or performed in other orders. All or a portion of each block, or a combination of blocks, may be implemented as computer program instructions (such as software), hardware (such as combinatorial logic, Application Specific Integrated Circuits (ASICs), Field-Programmable Gate Arrays (FPGAs) or other hardware), firmware or combinations thereof. Embodiments may be implemented by a processor executing, or controlled by, instructions stored in a memory. The memory may be random access memory (RAM), read-only memory (ROM), flash memory or any other memory, or combination thereof, suitable for storing control software or other instructions and data. Instructions defining the functions of the present invention may be delivered to a processor in many forms, including, but not limited to, information permanently stored on tangible non-writable storage media (e.g., read-only memory devices within a computer, such as ROM, or devices readable by a computer I/O attachment, such as CD-ROM or DVD disks), information alterably stored on tangible writable storage media (e.g., floppy disks, removable flash memory and hard drives) or information conveyed to a computer through a communication medium, including wired or wireless computer networks. Moreover, while embodiments may be described in connection with various illustrative data structures, systems may be embodied using a variety of data structures.

What is claimed is:

1. A packet routing method for directing packets of a session between an originating node and a destination node in an IP network, the method comprising an intermediate node that includes a processor configured to perform the steps of:
    obtaining a lead packet of a plurality of packets in a given session, the intermediate node having an electronic interface in communication with the IP network, the intermediate node obtaining the lead packet through the electronic interface;
    after obtaining the lead packet, assigning a session identifier to the given session, the session identifier being sufficient to enable the intermediate node to identify subsequent packets of the given session;
    storing the session identifier in a routing database;
    forwarding the lead packet toward the destination node, there being no predetermined path the lead packet will take between the originating node and the destination node;
    after the lead packet has been forwarded by the intermediate node and obtained by another node, receiving an identification of the other node;
    storing the identification of the other node in the routing database, in association with the session identifier, thereby adding the other node to a respective stateful ordered path of nodes between the source node and the destination node;
    receiving a plurality of additional packets;
    accessing the routing database to identify, among the plurality of additional packets, subsequent packets that originated at the originating node and are of the given session;
    for each identified packet of the given session:
        accessing the routing database to determine the other node associated with the given session; and
        forwarding the packet toward the destination node, along the stateful ordered path, via the other node.

2. The packet routing method as defined by claim 1 wherein the intermediate node includes a routing device or a switching device.

3. The packet routing method as defined by claim 1 wherein the stateful ordered path of nodes in each session includes a plurality of nodes between two end nodes, the plurality of nodes between the two end nodes in each session being configured to transmit each packet in its session in the same node order between the two end nodes.

4. The packet routing method as defined by claim 1 wherein storing the identification of the other node in the routing database, in association with the session identifier, thereby adding the other node to the stateful ordered path of nodes between the source node and the destination node comprises accessing one or more of flow utilization and cost information relating to a plurality of nodes in the routing database.

5. The packet routing method as defined by claim 1 wherein the stateful ordered path comprises an ordered plurality of nodes between the originating node and the destination node, the ordered plurality of nodes having a first node next to the originating node, the first node being the intermediate node.

6. The packet routing method as defined by claim 1 wherein storing the identification of the other node in the routing database, in association with the session identifier, thereby adding the other node to the stateful ordered path of nodes between the source node and the destination node comprises determining utilization of a plurality of stateful ordered paths and bandwidth of the plurality of stateful ordered paths.

7. The packet routing method as defined by claim 1 further comprising the intermediate node:
    receiving an identification of a previous node that forwarded the lead packet toward the intermediate node;
    storing the identification of the previous node in the routing database, in association with the session identifier, thereby adding the previous node to the stateful ordered path of nodes;
    receiving a plurality of packets in a return session from the destination node, the packets in the return session being addressed toward the originating node; and
    for each packet of the plurality of packets:
        accessing the routing database to determine the previous node associated with the return session; and
        forwarding, through the electronic interface, all of the packets in the return session toward the originating node, along the stateful ordered path, via the previous node.

8. The packet routing method as defined by claim 1 wherein the destination node comprises an edge router for a data center network.

9. The packet routing method as defined by claim 1 wherein forwarding the lead packet comprises the intermediate node addressing the lead packet so that, between the lead packet being forwarded by the intermediate node and the lead packet being obtained by the other node, the lead packet traverses a series of network devices.

10. The packet routing method as defined by claim 1 further comprising:
    a previous node, that forwarded the lead packet toward the intermediate node, modifying the lead packet to indicate the lead packet has been handled by an augmented IP router; and
    the intermediate node using a modification of the lead packet to identify the lead packet as a lead packet and to trigger assigning the session identifier to the given session and storing the session identifier in the routing database.

11. The packet routing method as defined by claim 10 further comprising, before forwarding the lead packet to the destination node, restoring the lead packet to remove the modification of the lead packet.

12. The packet routing method as defined by claim 1 further comprising, after the other node obtains the lead packet, the other node sending a packet to the intermediate node, the packet containing the identification of the other node.

13. A routing device for directing packets of a session between an originating node and a destination node in an IP network, the router comprising:
    an electronic interface configured to receive a lead packet of a plurality of packets in a given session, the electronic interface being configured to be connectable to the IP network;
    a lead packet identifier configured to, after the electronic interface receives the lead packet, assign a session identifier to the given session, the session identifier being sufficient to enable the routing device to identify subsequent packets of the given session;
    a routing database, the routing database being configured to store information relating to a plurality of sessions in the IP network, the information about each session including a session identifier and an identification of a next node in the stateful ordered path;

a packet series manager configured to store the session identifier in the routing database;

a router configured to forward the lead packet via the electronic interface toward the destination node, there being no predetermined path the lead packet will take between the originating node and the destination node;

a downstream controller identifier configured to, after the lead packet has been forwarded by the router and obtained by another node, receive an identification of the other node and store the identification of the other node in the routing database, in association with the session identifier, thereby adding the other node to a respective stateful ordered path of nodes between the source node and the destination node; and a subsequent packet modifier configured to receive, via the electronic interface, a plurality of additional packets, access the routing database to identify, among the plurality of additional packets, subsequent packets that are of the given session and that originated at the originating node and, for each identified packet of the given session:

access the routing database to determine the other node associated with the given session; and forward, using the router, the packet toward the destination node, along the stateful ordered path, via the other node.

14. The routing device as defined by claim 13 wherein the stateful ordered plurality of nodes in each session includes a plurality of nodes between two end nodes, the plurality of nodes between the two end nodes in each session being configured to transmit each packet in its session in the same node order between the two end nodes.

15. The routing device as defined by claim 13 wherein the downstream controller identifier is configured to store the identification of the other node in the routing database, in association with the session identifier, by accessing one or more of utilization and cost information relating to a plurality of nodes in the routing database.

16. The routing device as defined by claim 13 wherein the stateful ordered path comprises an ordered plurality of nodes between the originating node and the destination node, the ordered plurality of nodes having a first node next to the originating node, the first node being the routing device.

17. The routing device as defined by claim 13 wherein the information about each session includes utilization of the associated stateful ordered path and bandwidth of the associated stateful ordered path.

18. The routing device as defined by claim 13 further comprising:

a return packet identifier configured to receive a plurality of packets in a return session from the destination node, the packets in the return session being addressed toward the originating node and a return packet modifier configured to, for each packet of the plurality of packets:

access the routing database to determine a previous node associated with the return session; and forward, through the electronic interface, all of the packets in the return session toward the originating node, along the stateful ordered path, via the previous node.

19. The routing device as defined by claim 13 wherein the destination node comprises an edge router for a data center network.

20. The routing device as defined by claim 13 wherein the lead packet traverses a series of network devices after it is forwarded through the electronic interface and before the next node receives the lead packet.

21. The routing device as defined by claim 13 further comprising a lead packet modifier configured to modifying the lead packet to indicate the lead packet has been handled by an augmented IP router.

22. A non-transitory computer-readable medium encoded with instructions that, when executed by a processor, establish processes for directing packets of a session between an originating node and a destination node in an IP network, the processes comprising:

a process configured to control an electronic interface of a routing device in an intermediate node to obtain a lead packet of a plurality of packets in a given session, the electronic interface being connectible with the IP network;

a process in the intermediate node configured to, after obtaining the lead packet, assign a session identifier to the given session, the session identifier being sufficient to enable the intermediate node to identify subsequent packets of the given session;

a process in the intermediate node configured to store the session identifier in a routing database;

a process in the intermediate node configured to forward the lead packet toward the destination node, there being no predetermined path the lead packet will take between the originating node and the destination node;

a process in the intermediate node configured to, after the lead packet has been forwarded by the intermediate node and obtained by another node, receive an identification of the other node;

a process in the intermediate node configured to store the identification of the other node in the routing database, in association with the session identifier, thereby adding the other node to a stateful ordered path of nodes between the source node and the destination node;

a process in the intermediate node configured to receiving a plurality of additional packets;

a process in the intermediate node configured to access the routing database to identify, among the plurality of additional packets, subsequent packets that originated at the originating node and are of the given session; and a process in the intermediate node configured to, for each identified packet of the given session:

access the routing database to determine the other node associated with the given session; and forward the packet toward the destination node, along the stateful ordered path, via the other node.

23. The computer-readable medium as defined by claim 22 wherein the stateful ordered path of nodes in each session includes a plurality of nodes between two end nodes, the plurality of nodes between the two end nodes in each session being configured to transmit each packet in its session in the same node order between the two end nodes.

24. The computer-readable medium as defined by claim 22 wherein the process configured to store the identification of the other node is further configured to access one or more of utilization and cost information relating to a plurality of nodes in the routing database.

25. The computer-readable medium as defined by claim 22 wherein the stateful ordered path comprises an ordered plurality of nodes between the originating node and the destination node, the ordered plurality of nodes having a first node next to the originating node, the first node being the routing device.

26. The computer-readable medium as defined by claim 22 wherein the process configured to store the identification of the other node is further configured to store information about utilization of the stateful ordered path and bandwidth of the stateful ordered paths in association with the session identifier.

27. The computer-readable medium as defined by claim 22 wherein the processes further comprise:
- a process in the intermediate node configured to receive a plurality of packets in a return session from the destination node, the packets in the return session being addressed toward the originating node; and
- a process in the intermediate node configured to access the routing database to determine a previous node associated with the return session; and forward, through the electronic interface, all of the packets in the return session toward the originating node, along the stateful given path, via the previous node.

28. The computer-readable medium as defined by claim 22 wherein the destination node comprises an edge router for a data center network.

29. The computer-readable medium as defined by claim 22 wherein the lead packet traverses a series of network devices after it is forwarded by the intermediate node and before the next node receives the lead packet.

* * * * *